United States Patent
Mun et al.

(10) Patent No.: US 11,114,102 B2
(45) Date of Patent: Sep. 7, 2021

(54) APPLIANCE INCLUDING VOICE RECOGNITION DEVICE

(71) Applicant: LG ELECTRONICS INC., Seoul (KR)

(72) Inventors: Seongkuk Mun, Seoul (KR); Sujun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 16/249,747

(22) Filed: Jan. 16, 2019

(65) Prior Publication Data

US 2020/0227047 A1 Jul. 16, 2020

(51) Int. Cl.
*G10L 15/26* (2006.01)
*G10L 15/22* (2006.01)
*F24F 11/526* (2018.01)

(52) U.S. Cl.
CPC .......... *G10L 15/26* (2013.01); *F24F 11/526* (2018.01); *G10L 15/22* (2013.01)

(58) Field of Classification Search
CPC ......... F24F 11/526; G10L 15/22; G10L 15/26
USPC .......................................................... 700/94
See application file for complete search history.

(56) References Cited

U.S. PATENT DOCUMENTS

| | | | | | |
|---|---|---|---|---|---|
| 3,786,203 | A | * | 1/1974 | Reddick | H04M 1/02 379/447 |
| 4,424,419 | A | * | 1/1984 | Chaput | H04R 19/01 307/400 |
| 2008/0260178 | A1 | * | 10/2008 | Tanaka | H04R 1/406 381/92 |
| 2014/0149118 | A1 | * | 5/2014 | Lee | G10L 15/22 704/251 |
| 2016/0073187 | A1 | * | 3/2016 | Shin | H04R 1/1016 381/380 |
| 2016/0094911 | A1 | * | 3/2016 | Kropf | H04R 1/44 381/334 |
| 2018/0182387 | A1 | * | 6/2018 | Chua | G06F 3/167 |
| 2018/0199123 | A1 | * | 7/2018 | Rao | G06F 1/203 |
| 2019/0394547 | A1 | * | 12/2019 | Lemons | G10L 15/28 |

FOREIGN PATENT DOCUMENTS

| | | |
|---|---|---|
| JP | 2004343668 A | 12/2004 |
| JP | 2017011583 A | 1/2017 |
| KR | 10-2005-0094249 A | 9/2005 |
| KR | 10-2014-0136199 A | 11/2014 |

* cited by examiner

*Primary Examiner* — Hemant S Patel
(74) *Attorney, Agent, or Firm* — Dentons US LLP

(57) ABSTRACT

An appliance including a voice recognition device, the voice recognition device including a sound output device and a voice input device, wherein the sound output device is configured to output sound toward the inside of the panel, and the voice input device is configured to collect voice transmitted from the outside of the panel toward the panel.

36 Claims, 25 Drawing Sheets

Related art

APPLIANCE INCLUDING VOICE RECOGNITION DEVICE

CROSS REFERENCE TO RELATED APPLICATION

The present application claims priority under 35 U.S.C. § 119 and 35 U.S.C. § 365 to Korean Patent Application No. 10-2018-0117141, filed on Oct. 1, 2018, the entire content of which is incorporated herein by reference.

BACKGROUND

The present disclosure relates to an appliance including a voice recognition device.

Some conventional technology includes an interface through which voice is implemented between an appliance and a user. When the user inputs predetermined information through a voice input device such as a microphone, the appliance interprets the input voice information and recognizes the input voice information as an operation command of the appliance. The appliance operates a driving unit, such as a motor or a compressor, provided in the appliance according to the recognized operation command. The appliance can also inform the user of information about the operation of the appliance through a sound output device, such as a speaker.

Appliances controlled using a remote controller are problematic for a variety of reasons, including because the remote controller can get lost or misplaced, the remote controller is a required input device through which to input predetermined commands.

FIG. 25 illustrates a conventional voice input device and sound output device provided in an appliance. Referring to FIG. 25, the appliance P of the related art includes a panel 1 which forms an external appearance and a vibration source 2 which is provided inside the panel 1. The vibration source 2 may include a driving unit (for example, a motor or a compressor) or a rotating body (for example, a fan or a drum) for driving the appliance.

The appliance P includes a microphone 3 which receives the user's voice and a speaker 4 which outputs information on the operation of the appliance. The microphone 3 and the speaker 4 may be installed on one surface of the panel 1. For example, the one surface of the panel 1 may constitute a front surface of the appliances P.

The speaker 4 can output a sound S like an electronic sound to the front side of the appliances P. The microphone 3 is configured to collect and recognize the user's voice transmitted from the front side of the appliance P.

A microphone hole 5 through which a user's voice is transmitted is formed on the one surface of the panel 1. The microphone 3 is spaced apart from the microphone hole 5 by a predetermined distance in an inner direction relative to the panel 1. This configuration prevents the vibration generated in the appliance P from being transmitted to the microphone 3 through the panel 1 where the microphone 3 is in close proximity with the one surface of the panel.

According to this structure, the following problems may occur.

First, since the microphone 3 is disposed away from the one surface of the panel 1 in an inner direction, a noise source generated in the appliance P through the spaced space is transmitted to the microphone 3. The noise source may include noise generated from the vibration source 2 itself. A collision occurs between the microphone 3 and the surrounding components due to the vibration Vo generated in the vibration source 2, and noise due to the collision can constitute the noise source (N1).

Second, howling of the sound generated in the speaker 4 is transmitted toward the microphone 3 and is collected to the microphone 3 through a spaced space between the one surface of the panel 1 and the microphone 3 and acts as noise (N2).

Third, since the sound S generated from the speaker 4 is directly output to the front side of the appliance P and the sound S is input to the microphone 3 positioned at a distance adjacent to the speaker 4, the sound S acts as noise to the user's voice.

Korean Patent Application No. 10-2014-0136199, published on Nov. 28, 2014, discloses an example of such conventional technology.

SUMMARY

The present invention has been made to solve the above problems and an objective of the present invention is to provide an appliance including a voice recognition device in which a voice input device and a sound output device are provided.

Another objective of the present invention is to provide an appliance which can partition a voice transmission path collected through the voice input device and a sound transmission path output through the sound output device to prevent the output sound from acting as noise to the voice input device.

In particular, the voice transmission path allows the user's voice to be transmitted from the outside of the appliance to the panel, and the sound transmission path is such that the sound is output to the inner direction of the panel and then transmitted to the outside of the panel through the transmission plate and thus it is possible to prevent the sound from acting as noise to the voice input device.

Another objective of the present invention is to provide an appliance in which the voice input device and the sound output device are disposed so as to overlap each other in a front and rear direction and can easily partition transmission paths of voice/sound input or output at each device.

Another objective of the present invention is to provide an appliance in which the voice input device and the sound output device are disposed in the vertical direction, and which can easily partition the transmission paths of voice/sound input or output at each device.

Another objective of the present invention is to provide an appliance in which a plurality of voice input devices are provided, thereby improving the voice recognition rate of the user.

Another objective of the present invention is to provide an appliance in which the sound output device is disposed at the center line of the voice recognition device in the vertical direction and the voice input device is disposed at the left and right sides of the center line so that sound output from the sound output device is prevented from being non-uniformly transmitted to the voice input device.

Another objective of the present invention is to provide an appliance in which the voice input device and the sound output device are integrally formed in the body so that each device can be easily assembled and a compact voice recognition device can be provided.

Another objective of the present invention is to provide an appliance in which a partition wall is provided between the voice input device and the sound output device to prevent sound output from the sound output device from being directly transmitted to the voice input device.

Another objective of the present invention is to provide an appliance in which the voice input device is provided to be in close proximity with the inner surface of the panel so as to be capable of preventing the noise generated inside the appliance from being transmitted to the voice input device.

Another objective of the present invention is to provide an appliance in which a sealing member which contacts the inner surface of a panel is included in the voice input device, so that vibration, which is generated in the appliance and is transmitted to the microphone of the voice input device through the panel, can be reduced.

Another objective of the present invention is to provide an appliance in which a panel hole formed on a panel, an opening portion of the sealing member, and a microphone hole of the microphone are aligned in the front and rear direction so that voice can be easily collected in the voice input device.

Another objective of the present invention is to provide an appliance which can sufficiently secure a voice transmission path even if the installation position of the sealing member is spaced apart from an exact position due to an assembly error when the voice input device is assembled, since the opening portion of the sealing member is larger than the size of the panel hole and the microphone hole and the size of the panel hole is larger than the size of the microphone hole.

Another objective of the present invention is to provide an appliance in which, in the voice input device, a cover is provided at a rear side of the microphone so that a noise, which is generated in an inside of the appliance and transmitted to the microphone, can be reduced.

Another objective of the present invention is to provide an appliance in which the size of the noise source transmitted to the voice input device can be reduced by allowing the voice input device to be provided at a lower portion of the panel of the appliance and to be positioned relatively far from the noise source.

An appliance according to an embodiment of the present invention is provided with a panel on which a panel hole is formed so that the user's voice input is possible.

The panel constitutes the front surface of the appliance, and the user easily accesses the panel hole.

A voice recognition device having a voice input device and a sound output device may be disposed on the inner surface of the panel, thereby implementing a user interface through voice and sound.

The voice input device may be disposed between the sound output device and the panel.

The sound output device is configured to output sound toward the inside of the panel, and the voice input device is configured to collect voice transmitted from the outside of the panel toward the panel, thereby improving the voice recognition rate.

The sound output device may be positioned on the center line of the voice recognition device in the vertical direction and two voice input devices may be disposed on both sides of the center line so that the center of gravity of the voice recognition device may be formed on the center line.

The voice input device and the sound output device may be integrally provided in one body so that the assembling properties of the voice recognition device can be improved.

A partition wall which partitions between the voice input device and the sound output device may be provided so that sound output from the sound output device can be prevented from being transmitted to the voice input device.

The partition walls may be provided with a partition wall opening portion, and voice input devices and sound output devices may be installed in the front side and the rear side of the partition wall opening portion to improve the assembling properties.

The partition wall may include a support plate for supporting the panel and a body of the voice recognition device.

The voice input device and the sound output device may be disposed so as to overlap each other in the front and rear directions so that a space for installing the voice recognition device can be reduced.

The voice input device and the sound output device may be aligned in the lateral direction.

The sound output device may be disposed between two voice input devices.

The voice input device may be disposed above or below the sound output device to distinguish between a transmission path of voice collected by the voice input device and a transmission path of sound output from the sound output device.

The voice input device may include a PCB having a microphone hole and a microphone installed on the PCB, such that the microphone is in communication with the microphone hole.

The voice input device may include a cover which presses the microphone toward the panel.

The cover may be disposed to surround the outsides of the PCB and the microphone. The cover may be in contact with the inner surface of the panel.

The cover may be disposed in the mounting portion of the body.

The voice input device may contact the panel.

The voice input device may be provided with a sealing member protruding from the PCB toward the panel so as to be in close proximity with the panel, thereby sealing a space around the panel hole. Accordingly, it is possible to prevent the noise transmitted from the inside or the outside of the appliance from being transmitted to the voice input device.

The sealing member may be in close proximity with the inner surface of the panel at the periphery of the panel hole. The sealing member may define a sealing opening portion communicating with the panel hole.

Since the sealing member can be formed larger than the panel hole and the microphone hole, it is possible to prevent the sealing member from shielding the panel hole or the microphone hole even if an error occurs in the installation position of the sealing member.

A howling plate may be provided at the rear side of the panel to generate howling due to sound output from the sound output device.

The howling plate may be configured with panel flanges of the first and second side panels provided on both sides of the panel.

The howling plate may be bent in a V shape, and sound output from the sound output device can be reflected by the howling plate and transmitted to the front side of the panel.

An upper portion of the body of the voice recognition device may be coupled to a support plate that is coupled to the inner surface of the panel.

The lower portion of the body may be coupled to the panel by a fastening member.

The appliance may include an air conditioner, and the panel constitutes a front panel so that user access to the panel hall is relatively easy.

According to the foregoing embodiments of the present invention, because the appliance includes the voice recognition device having the voice input device and the sound output device, it is possible to implement the user interface through voice/sound.

In addition, because the voice transmission path collected through the voice input device may be partitioned from the sound transmission path output through the sound output device, the output sound may be prevented from acting as noise to the voice input device.

In addition, the voice transmission path allows the user's voice to be transmitted from the outside of the appliance to the panel, and the sound transmission path is such that the sound is output to the inner direction of the panel and then transmitted to the outside of the panel through the transmission plate, and thus the sound may be prevented from acting as noise of the voice input device.

Since the voice input device and the sound output device may be disposed so as to overlap each other in the front and rear direction, the transmission path of voice/sound input or output from each device can be easily partitioned.

The voice input device and the sound output device may be disposed in the vertical direction, and the transmission path of voice/sound input or output from each device can be easily partitioned.

In addition, a plurality of voice input devices may be provided so that the voice recognition rate of the user can be improved.

In addition, since the sound output device may be disposed at the center line of the voice recognition device in the vertical direction and the voice input device is disposed at the left and right sides of the center line, sound output from the sound output device can be prevented from being non-uniformly transmitted to the voice input device.

In addition, since the voice input device and the sound output device may be integrally formed in the body, it is possible to provide a voice recognition device which is compact and easy to assemble.

In addition, the voice recognition device may include a partition disposed between the voice input device and the sound output device, so that sound output from the sound output device can be prevented from being directly transmitted to the voice input device.

In addition, the voice input device may be installed in close proximity with the inner surface of the panel, so that the noise generated inside the appliance can be prevented from being transmitted to the voice input device.

In addition, the voice input device may include a sealing member that is in contact with the inner surface of the panel, thereby reducing the transmission of the vibration generated in the appliance to the microphone through the panel.

In addition, the panel hole formed on the panel, the opening portion of the sealing member, and the microphone hole of the microphone may be aligned in the front and rear direction, so that voice collection in the voice input device can be facilitated.

In particular, since the opening portion of the sealing member is larger than the sizes of the panel hole and the microphone hole and the size of the panel hole is larger than the size of the microphone hole, the voice transmission path may be sufficiently secured even when the installation position of the sealing member is spaced apart from the exact position thereof due to an assembly error when the voice input device is assembled. In other words, the voice transmission path can be prevented from being blocked.

In addition, the voice input device may include a cover located at the rear side of the microphone, thereby reducing the transmission of noise generated in the appliance to the microphone.

In addition, the voice input device may be disposed at a lower portion of the panel of the appliance to be positioned relatively far away from the noise source provided in the appliance, so that the size of the noise source transmitted to the voice input device can be reduced.

BRIEF DESCRIPTION OF THE DRAWINGS

To achieve the foregoing objects, and in accordance with the purpose of the invention as embodied and broadly described herein.

DETAILED DESCRIPTION OF THE EMBODIMENTS

Figure 1:
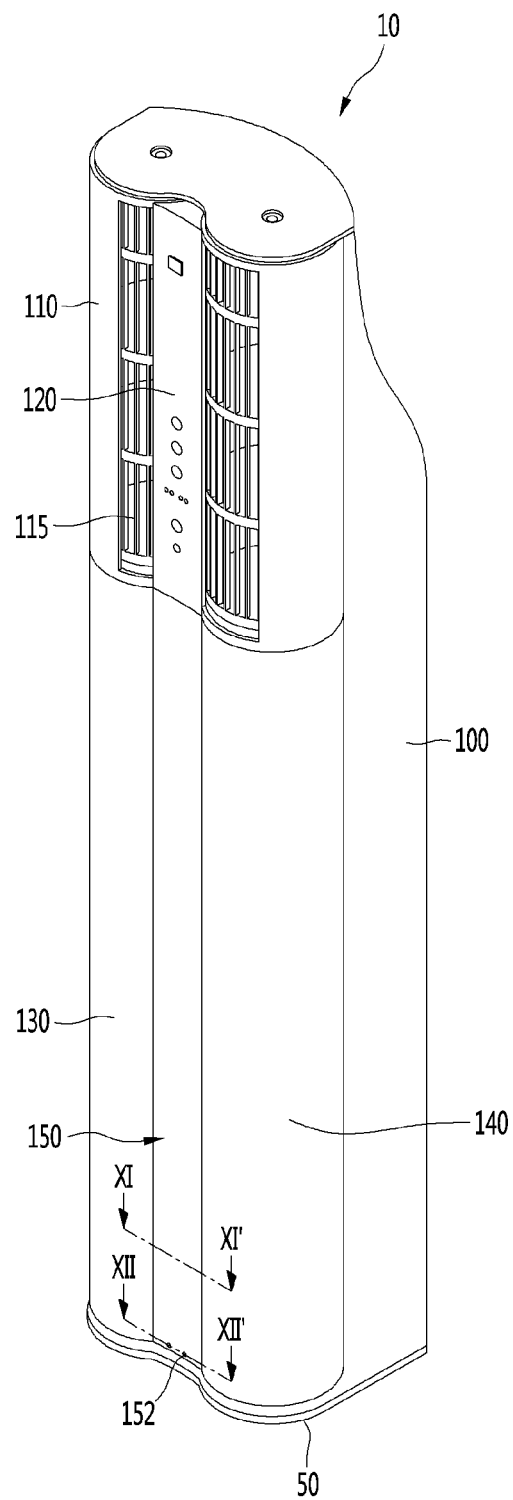
FIG. 1 is a perspective view illustrating a configuration of an appliance according to a first embodiment of the present invention.

Hereinafter, specific embodiments of the present invention will be described with reference to the drawings.

It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description of the Preferred Embodiments and/or elsewhere in the application file.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

The term "combination", "combinatory," or "combinations thereof" as used herein refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. A skilled artisan will understand that typically there is no limit on a number of items or terms in any combination, unless otherwise apparent from the context.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Words such as "then," "next," etc. are not intended to limit the order of the steps; these words are simply used to guide the reader through the description of the methods.

Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Figure 2:
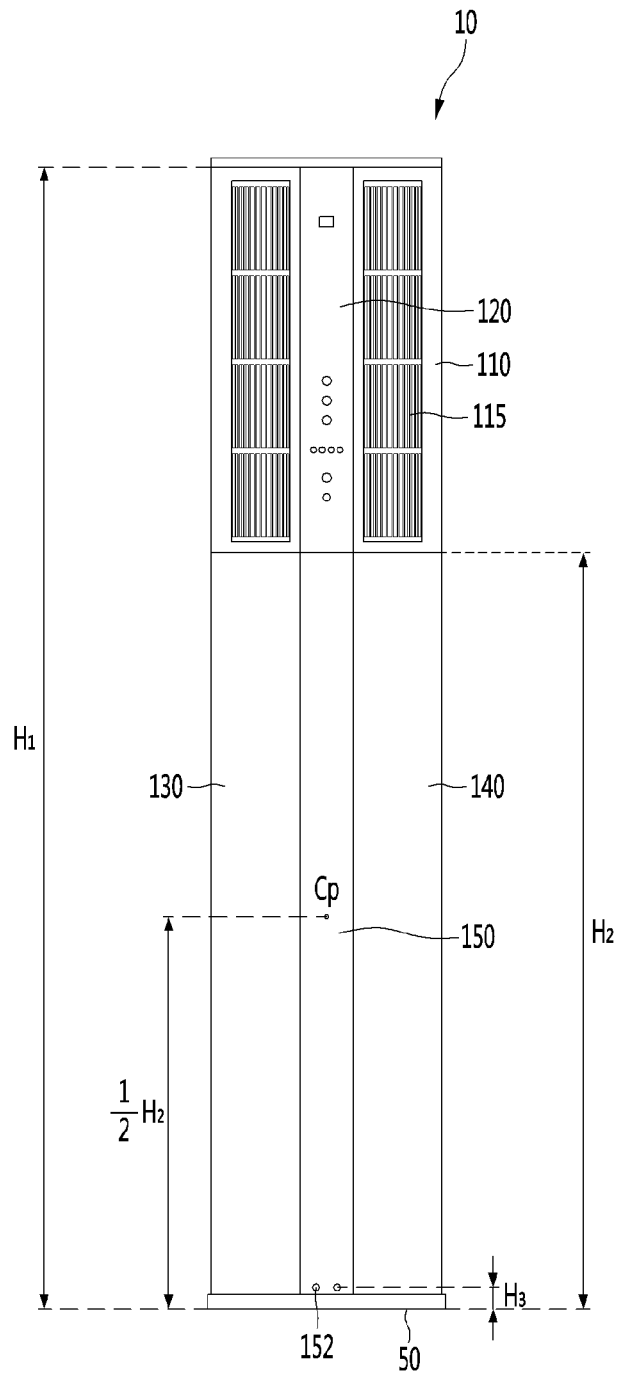
FIG. 2 is a front view illustrating a configuration of the appliance according to the first embodiment.
Figure 3:
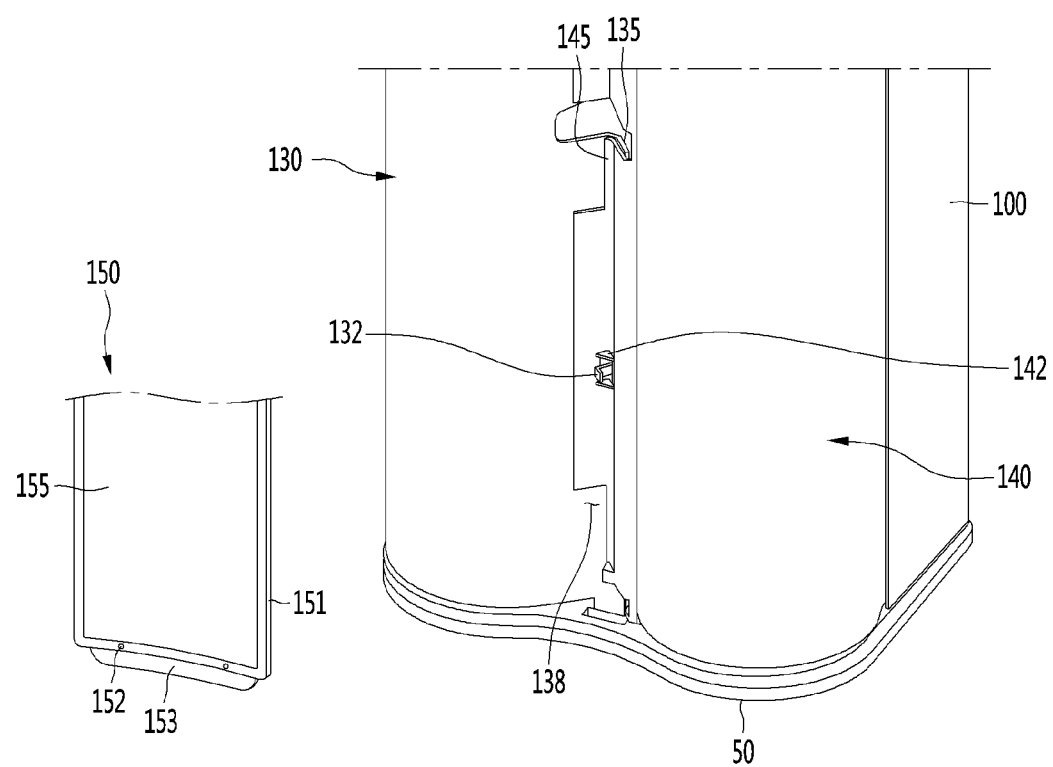
FIG. 3 is an exploded perspective view illustrating a configuration of a cabinet and a front panel of the appliance according to the first embodiment.
Figure 4:
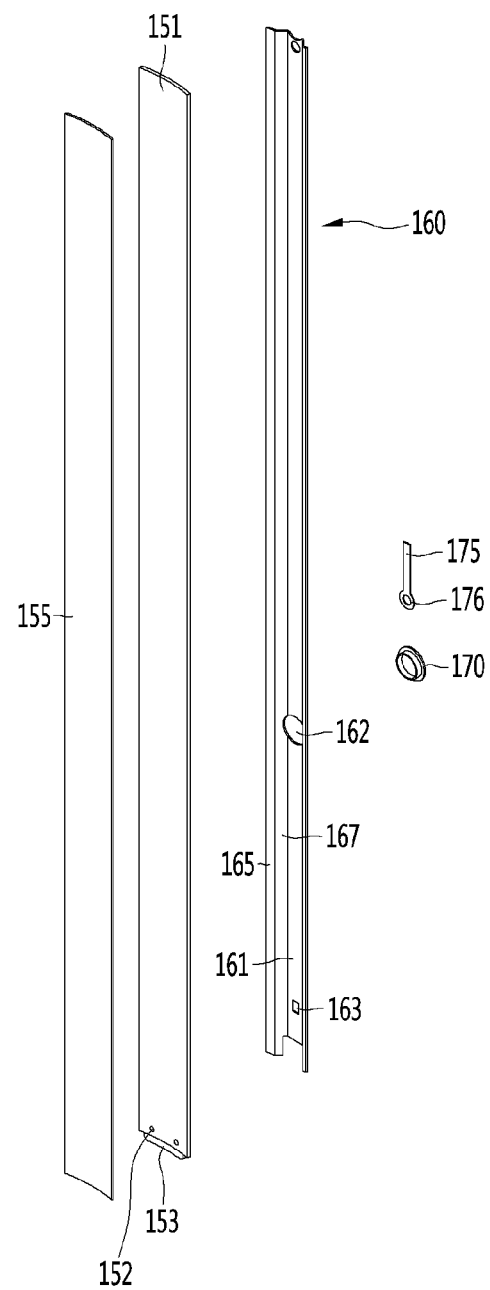
FIG. 4 is an exploded perspective view illustrating a configuration of the front panel according to the first embodiment.

FIG. 1 is a perspective view illustrating a configuration of an appliance according to a first embodiment of the present invention. FIG. 2 is a front view illustrating a configuration of the appliance according to the first embodiment. FIG. 3 is an exploded perspective view illustrating a configuration of a cabinet and a front panel of the appliance according to the first embodiment. FIG. 4 is an exploded perspective view illustrating a configuration of the front panel according to the first embodiment.

Referring to FIG. 1 and FIG. 2, an appliance 10, such as an air conditioner, may be provided with a voice recognition device that is configured to identify voice information. The appliance 10 may include a cabinet 100 and panels 130, 140 and 150 coupled to the cabinet 100. It is understood that the invention described herein can be applied to other appliances, such as for example, a refrigerator, a washing machine, a clothes dryer machine, a dish washer, a cooking appliance, etc., and is not limited to an aft conditioner.

Inside the cabinet 100, a driving unit, for example, a fan motor and a fan, which can generate vibration or noise, may be included. The airflow generated by the driving of the fan can be discharged to the front side of the appliances 10 through a discharge device 110.

As shown in FIG. 1, the discharge device 110 may be provided at a front upper portion of the cabinet 100. The discharge device 110 may include a discharge grill 115 for discharging conditioned air. For example, as shown, the discharge device 110 may include two discharge grilles 115 that are spaced apart from each other in the lateral direction.

The appliance 10 may further include a display 120 for displaying information on the operation of the appliance 10 on a display screen (e.g., LCD). The display 120 may be disposed between the two discharge grilles 115, but of course is not limited to any particular location on the appliance 10.

As shown, the panels 130, 140, and 150 may be disposed at a lower side of the discharge device 110 and the display 120 (e.g., below the discharge device 110). For example, the panels 130, 140 and 150 may include two side panels 130 and 140 disposed on the front both sides of the cabinet 100 (spaced apart from each other in the lateral direction) and a front panel 150 disposed between the two side panels 130 and 140. The two side panels 130 and 140 include a first side panel 130 disposed on the left side of the front panel 150 and a second side panel 140 disposed on the right side of the front panel 150.

The appliance 10 may further include a base 50 constituting the lowest face of the appliance 10. The front panel 150 may extend upwardly from the base 50 to the display 120. The front panel 150 may form an external appearance of a front central portion of the appliances 10.

Figure 12:
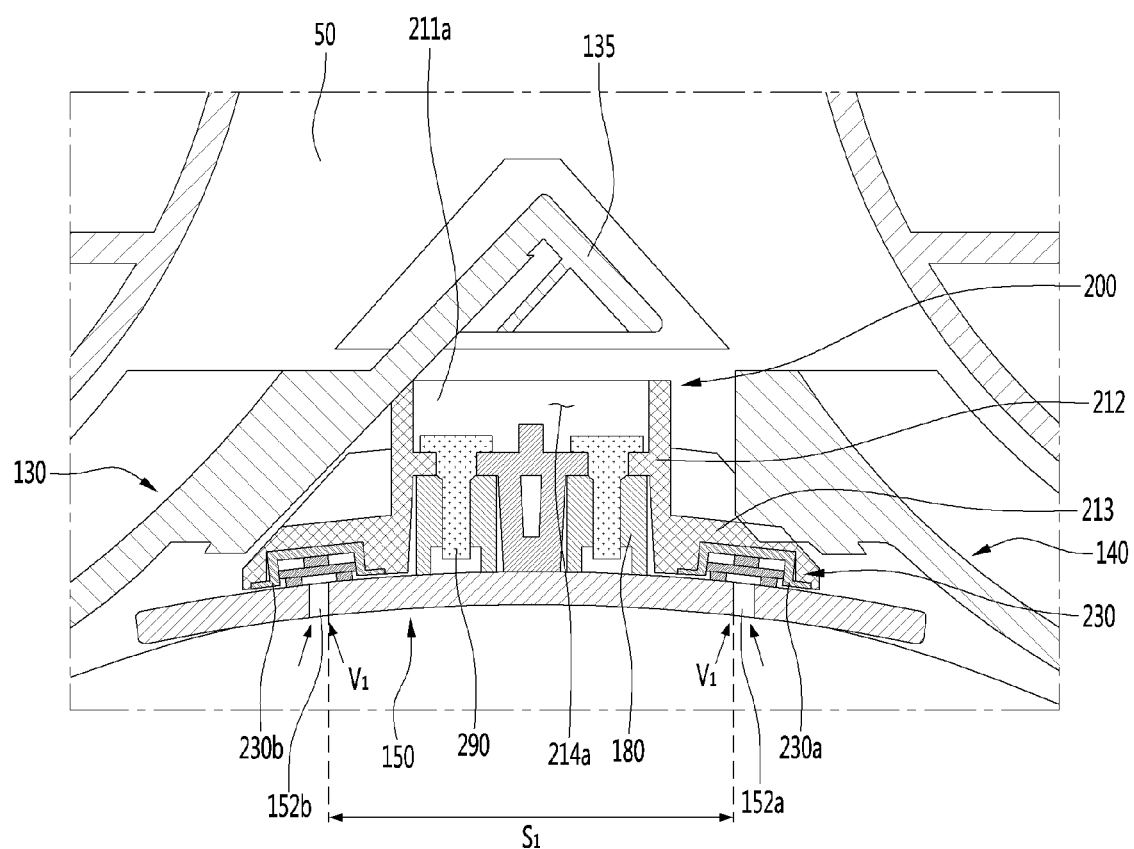
FIG. 12 is a sectional view taken along line XII-XII' in FIG. 1.

The appliance 10 further includes a panel hole 152 for collecting external voice (V1, see FIG. 12). For example, the panel hole may be formed in the front panel 150. For example, the panel hole 152 may be positioned below the front panel 150. For example, the panel hole 152 may have a circular shape (not limited thereto).

The panel hole 152 is preferably provided in the plurality, such that a plurality of panel holes 152 are provided and include a first panel hole 152a and a second panel hole 152b which are spaced apart from each other. The first and second panel holes 152a and 152b may be spaced apart from each other in the traverse direction.

As shown in FIG. 2, the height from the lower end portion of the base 50 to the upper end portion of the appliance 10, which is referred to herein as a first height H1, may be greater than the height from the lower end portion of the base 50 to the upper end portion of the front panel, which is referred to herein as a second height H2. Also, the height from the lower end portion of the base 50 to the panel hole 152, which is referred to herein as a third height H3, may be less than ½ of the second height H2.

More particularly, the panel hole 152 may be disposed below the front panel 150, that is, on the lower side thereof with respect to the central portion Cp in the vertical direction. According to such a configuration, since the panel hole 152 for collecting voice can be positioned far from the discharge device 110, the noise of the airflow discharged from the discharge device 110 can be prevented from being transmitted to the panel hole 152.

Referring to FIG. 3, the first side panel 130 and the second side panel 140 may form an external appearance at both sides of the front portion of the appliance 10. For example, the first and second side panels 130 and 140 may have a front surface protruding in a forward direction to be rounded.

The first and second side panels 130 and 140 may be coupled to each other. More particularly, the first side panel 130 includes a first panel flange 135 positioned at the central portion of the front surface of the appliance 10 and having a bent shape. For example, the first panel flange 135 may be bent into a "V" shape.

The second side panel 140 includes a second panel flange 145 positioned at the central portion of the front surface of the appliance 10 and having a bent shape. For example, the second panel flange 145 may be bent into a "V" shape.

The first panel flange 135 and the second panel flange 145 may be disposed to abut each other in the front and rear direction. For example, as illustrated in FIG. 3, the second panel flange 145 may be disposed on the front surface of the first panel flange 135, and the bent V shapes of the panel flanges 135 and 145 can be matched with each other. Of course, it is understood that the second panel flange 145 may be disposed on the rear surface of the first panel flange 135.

As a result of the first and second panel flanges 135 and 145, a central portion of the appliance 10 can form a recessed portion 138 recessed backward. For example, due to the bent shape of the first and second panel flanges 135 and 145, the recessed portion 138 may have a shape recessed rearward in a V shape as viewed from above the appliance 10.

The first and second side panels 130 and 140 may be provided with coupling devices 132 and 142 for coupling the panels 130 and 140 to each other. The coupling devices 132 and 142 may be provided on the first and second panel flanges 135 and 145.

For example, the coupling devices 132 and 142 may include a hook 132 which is provided on any one of the first and second panel flanges 135 and 145 and a hook coupling portion 142 which is provided on the other of the first and second flanges and configured to receive the hook 132. For example, as illustrated in the drawing, the hook 132 may be provided on the first panel flange 135 and the hook coupling portion 142 may be provided on the second panel flange 145.

The front panel 150 may be coupled to the front side of the recessed portion 138. The front panel 150 may have a thin rectangular plate-like shape, such as shown, but is not limited thereto. The recessed portion 138 of the first and second side panels 130 and 140 and the rear surface of the front panel 150 may define an installation space of the voice recognition device 200, by disposing the front panel 150 on the front side of the recessed portion 138.

The front panel 150 may include a panel main body 151 having a microphone hole 152 formed therein. The panel main body 151 may be made of a plastic material and may be transparent. The microphone hole 152 may pass through the lower portion of the panel main body 151.

The front panel 150 may further include a shielding portion 153 extending downward from the panel main body 151. The shielding portion 153 may be understood as a shielding plate for preventing the recessed portion 138 from being exposed to the outside through a gap between the lower portion of the panel main body 151 and the base 50. The shielding portion 153 may also prevent external foreign substances from flowing into the recessed portion 138. The shielding portion 153 may also provide aesthetic appeal for the external appearance of the appliance 10.

The front panel 150 may further include a film 155 provided at a front surface portion of the panel main body 151. The film 155 may be attached to the front surface of the panel main body 151 and may extend from the lower portion to the upper portion of the panel main body 151. The film 155 may be made of a semi-transparent or opaque material. The film 155 may be disposed so as not to shield or block the microphone hole 152. More particularly, as shown in FIG. 3, the lower end portion of the film 155 may be positioned above the microphone hole 152.

The front panel 150 may further include a support plate 160 that is coupled to a rear side of the panel main body 151. The support plate 160 may include a plate portion 161 extending in the vertical direction and having a flat plate shape and a flange portion 165 provided on both sides of the plate portion 161 and coupled to the panel main body 151. The flange portion 165 may be coupled to the panel main body 151, such as by an adhesive or a fastening member.

The support plate 160 may further include a plate extension portion 167 (see FIG. 5) extending from the plate portion 161 toward the flange portion 165. The plate extension portion 167 may extend obliquely forward from both ends of the plate portion 161 and may be connected to the flange portion 165.

The support plate 160 may further include a mechanism coupling portion 163 formed at a lower portion of the plate portion 161 that is configured to be coupled with the support protrusion 212e of the voice recognition device 200. The support plate 160 may further include a cap coupling portion 162 formed at a substantially central portion of the plate portion 161 in the vertical direction and to which the cap 170 is coupled.

The cap 170 supports the cable. The cap 170 is preferably formed of a rubber material, but is not limited thereto. A cable holder 175 may be provided on the cap 170. The cable holder 175 may be coupled to a rear surface of the plate portion 161 and may have an insertion hole 176 to receive a cable extending via the cap 170. A cable extending from the voice recognition device 200 may extend into an inside of the cabinet 100 via the cab 170 and the cable holder 175.

The support plate 160 may extend at the rear side of the panel main body 151 in the front and rear direction to be capable of constituting at least a portion of the partition wall B (see FIG. 18) partitioning the voice input device 230 and the sound output device 250 in the front and rear direction.

Figure 5:
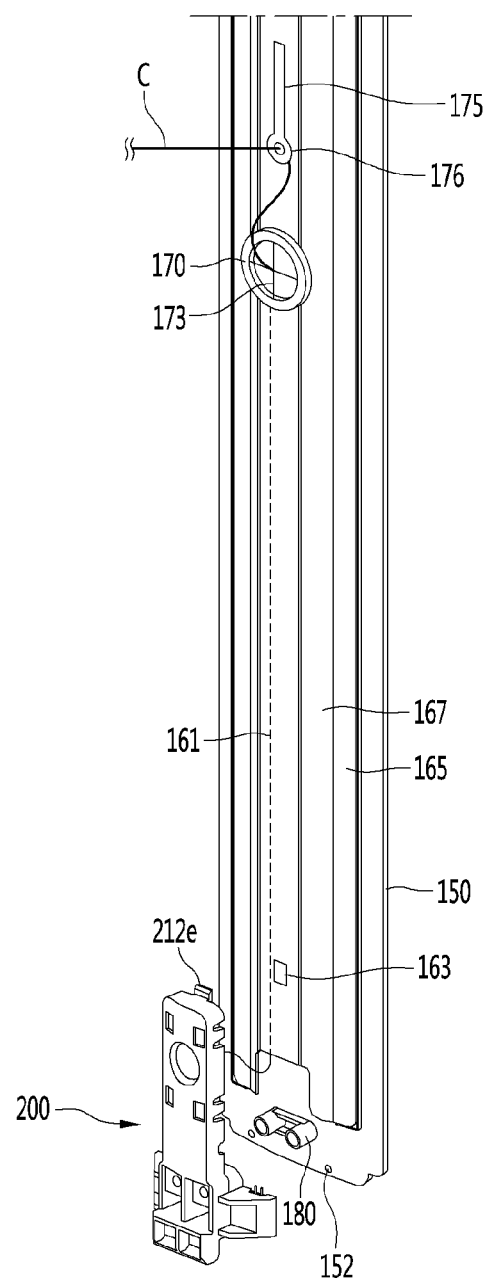
FIG. 5 is an exploded perspective view illustrating a configuration of the front panel and a voice recognition device according to the first embodiment.
Figure 6:
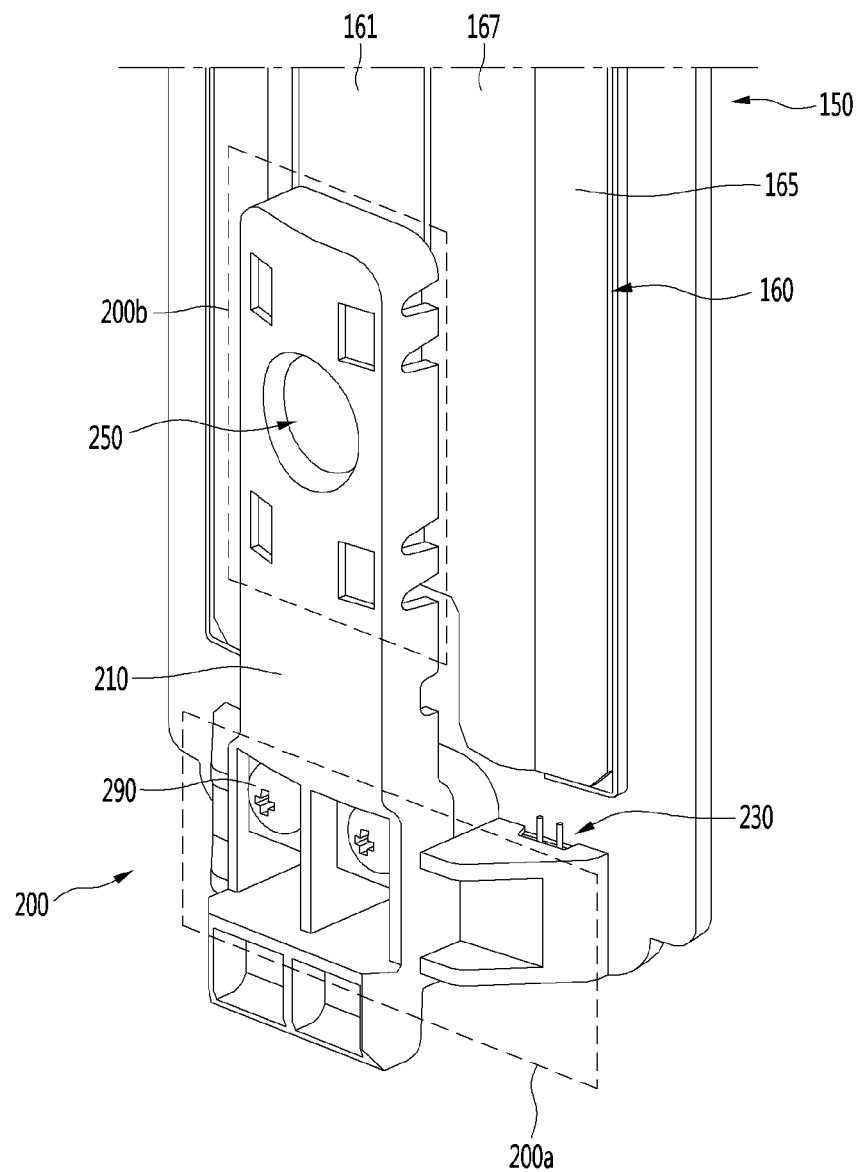
FIG. 6 is a view illustrating a state where the voice recognition device is coupled to the rear side of the front panel according to the first embodiment.

FIG. 5 is an exploded perspective view illustrating a configuration of the front panel and a voice recognition device according to the first embodiment of the present invention. FIG. 6 is a view illustrating a state where the voice recognition device is coupled to the rear side of the front panel according to the first embodiment.

Referring to FIG. 5 and FIG. 6, a voice recognition device 200 which implements an interface with a user through voice or sound may be provided at the rear side of the front panel 150.

More particularly, a fastening bracket 180 for coupling the voice recognition device 200 to the front panel 150 may be provided on a rear surface of the front panel 150. The fastening bracket 180 may protrude from the rear surface of the panel main body 151 and may be positioned above the panel hole 152. The fastening bracket 180 may be disposed below the mechanism coupling portion 163.

The appliance 10 may further include a fastening member 290 coupled to the fastening bracket 180 and the voice recognition device 200. For example, the fastening member 290 may be fastened to the fastening bracket 180 through the voice recognition device 200.

An upper portion of the voice recognition device 200 may be coupled to the mechanism coupling portion 163 by the support protrusion 212e and a substantially central portion of the voice recognition device 200 in the vertical direction can be fastened to the front panel 150 through the fastening bracket 180. According to this structure, the voice recognition device 200 can be substantially firmly supported on the front panel 150.

The voice recognition device 200 may include a voice part 200a for receiving a voice from a user and an audio part 200b for outputting a sound to inform the user of information regarding the operation of the appliance 10. The sound may include an electronic sound, a mechanical sound, a voice sound, or the like.

For example, the voice part 200a may be disposed below the voice recognition device 200, and the audio part 200b may be disposed above the voice recognition device 200.

The voice part 200a and the audio part 200b may be integrated into a single body. More particularly, the voice recognition device 200 may include a voice input device 230 provided in the voice part 200a and a sound output device 250 provided in the audio part 200b.

The voice recognition device 200 may further include a body 210 on which the voice input device 230 and the sound output device 250 are attached or mounted. For example, the body 210 extends in the vertical direction, the voice input device 230 is installed at a lower portion of the body 210, and the sound output device 250 is installed at an upper portion of the body 210.

Since the fastening member 290 is fastened to the voice part 200a and the support protrusion 212e is provided on the audio part 200b and is coupled to the support plate 160, the voice part 200a and the audio part 200b can be easily supported on the front panel 150.

The sound output device 250 may be disposed at the central portion of the body 210 in the lateral direction and two voice input devices 230 may be disposed on both sides of the lower portion of the body 210. With this configuration, the center of gravity of the voice recognition device 200 can be formed at the central portion of the body 210.

Figure 7:
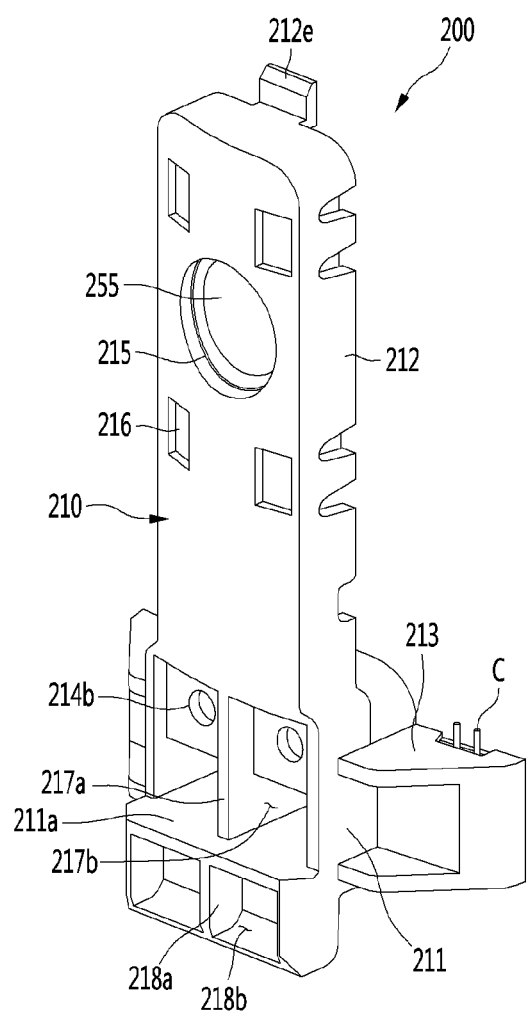
FIG. 7 is a rear perspective view illustrating a configuration of the voice recognition device according to the first embodiment.
Figure 8:
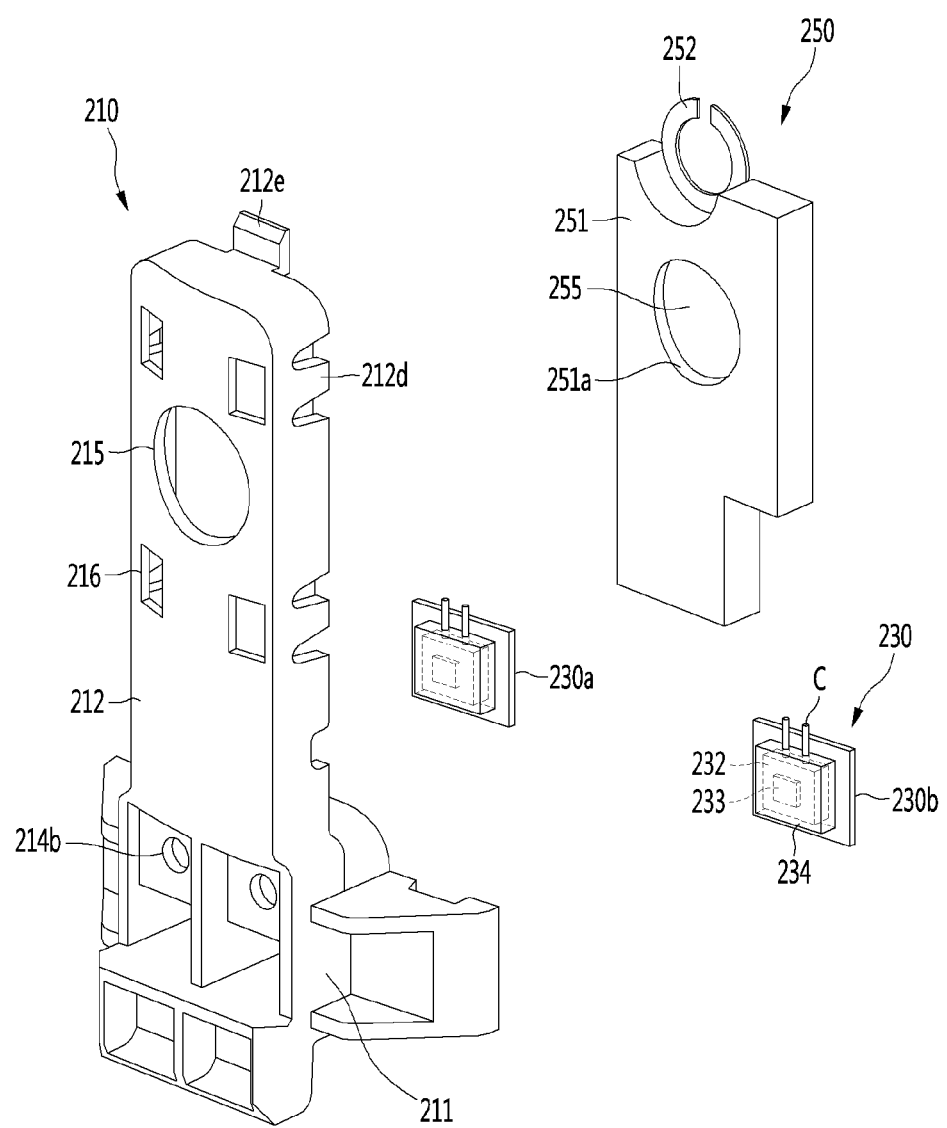
FIG. 8 is an exploded view illustrating a configuration of a rear side of the voice recognition device according to the first embodiment.
Figure 9:
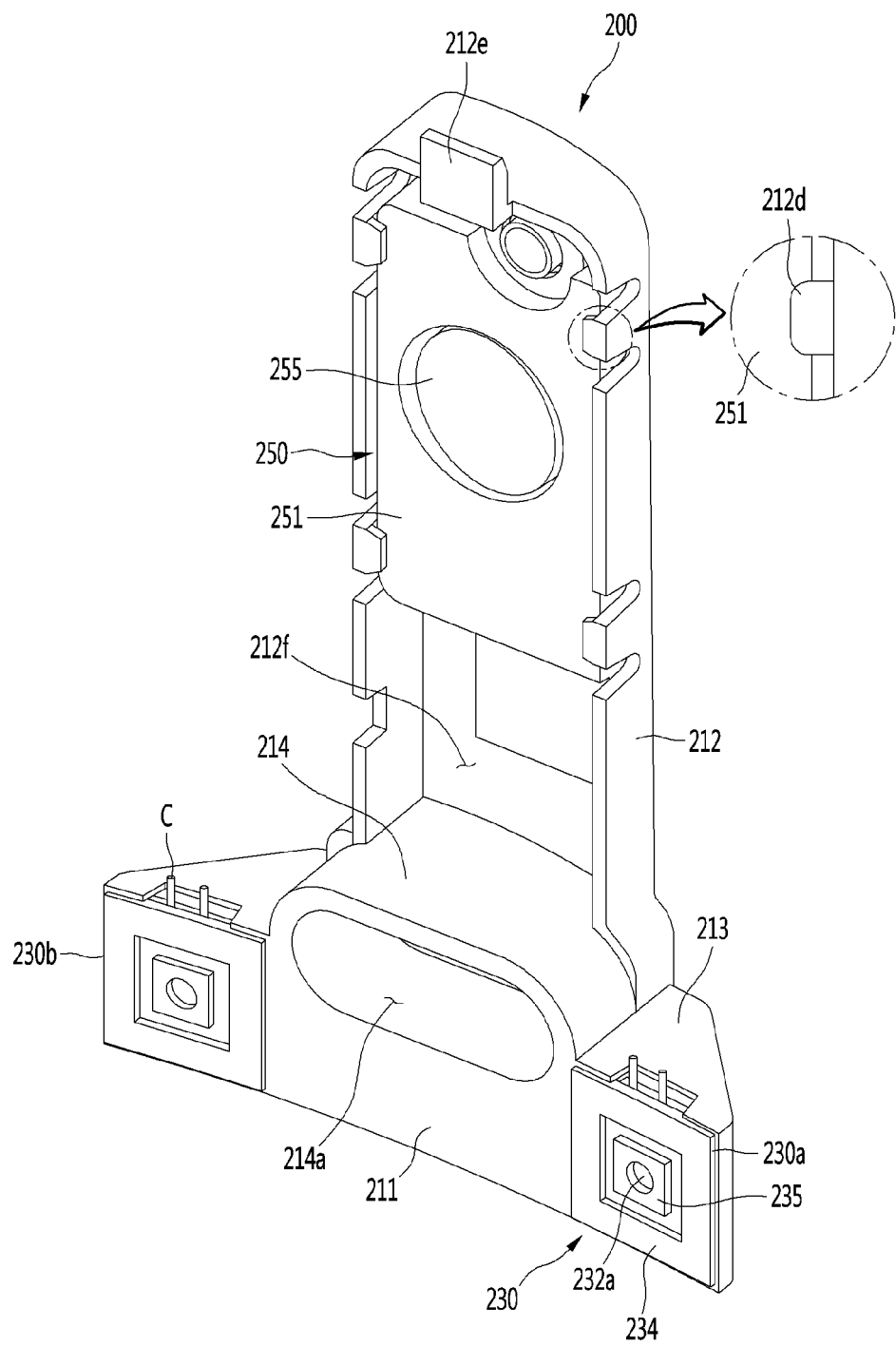
FIG. 9 is a front perspective view illustrating a configuration of the voice recognition device according to the first embodiment.
Figure 10:
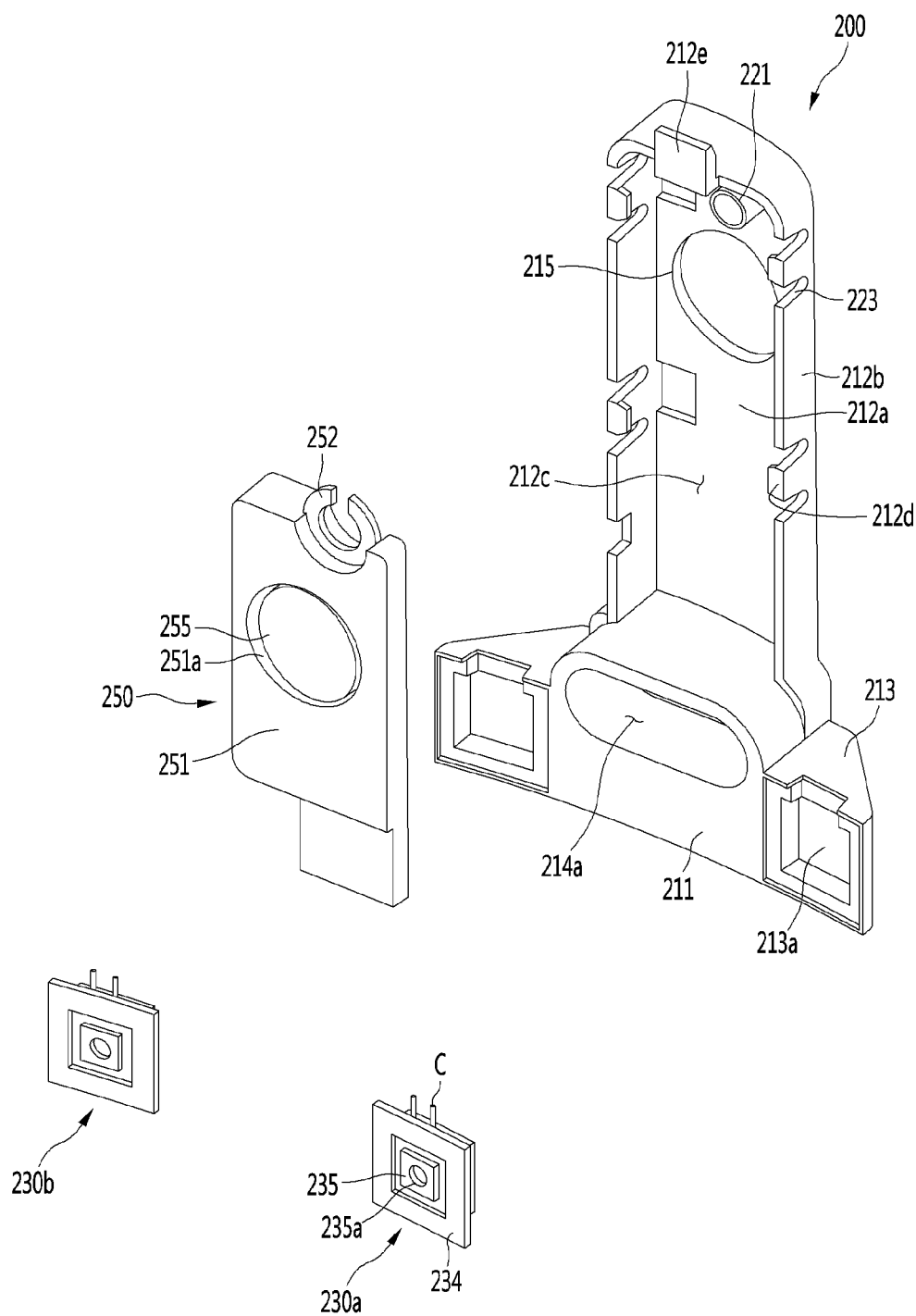
FIG. 10 is an exploded view illustrating a configuration of a front part of a voice recognition device according to the first embodiment.

FIG. 7 is a rear perspective view illustrating a configuration of the voice recognition device according to a first embodiment of the present invention. FIG. 8 is an exploded view illustrating a configuration of a rear side of the voice recognition device according to the first embodiment. FIG. 9 is a front perspective view illustrating a configuration of the voice recognition device according to the first embodiment. FIG. 10 is an exploded view illustrating a configuration of a front part of a voice recognition device according to the first embodiment.

Referring to FIGS. 7-10, the body 210 of the voice recognition device 200 includes a lower body 211 on which a voice input device 230 is installed and an upper body 212 on which the sound output device 250 is installed. The lower body 211 and the upper body 212 may be integrally formed.

The lower body 211 includes a bracket coupling portion 214 to which the fastening bracket 180 is coupled. The bracket coupling portion 214 may be formed with an accommodation groove 214a which is recessed rearward from the front surface of the lower body 211, such as shown. The fastening bracket 180 may be inserted into the accommodation groove 214a.

The rear surface portion of the bracket coupling portion 214 may include a fastening portion 214b to which the fastening member 290 is fastened. The fastening portion 214b may be disposed at the central portion of the lower body 211 in the lateral direction. A plurality of the fastening portions 214b may be provided. The plurality of fastening portions 214b may be arranged in the lateral direction with respect to each other. The accommodation groove 214a may be positioned at the front side of the plurality of fastening portions 214b.

A plurality of space portions 217b and 218b may be formed at the central portion of the lower body 211. The plurality of space portions 217b and 218b may be recessed forward from the rear surface of the lower body 211.

Since the mass of the body 210 is reduced by the plurality of space portions 217b and 218b, such structure can prevent or significantly reduce stress that is generated when the fastening member 290 is fastened to the lower body 211 from acting on the lower body 210. In addition, the material cost required when manufacturing the lower body 211 can be reduced because of the plurality of space portions 217b and 218b.

The plurality of space portions 217b and 218b may include the first space portion 217b in which the fastening portion 214b is positioned and the second space portion 218b which is formed on the lower side of the first space portion 217b.

The lower body 211 may further include a transverse plate 211a extending in the transverse direction. The first space portion 217b may be formed on the upper side of the transverse plate 211a and the second space portion 218b may be formed on the lower side of the transverse plate 211a.

The lower body 211 may further include reinforcing ribs 217a and 218a for reinforcing the strength of the lower body 211. The reinforcing ribs 217a and 218a may include a first reinforcing rib 211a extending upward from the transverse plate 211a. The first reinforcing ribs 217a may be disposed between the plurality of fastening portions 214b.

The reinforcing ribs 217a and 218a may further include a second reinforcing rib 218a extending downward from the transverse plate 211a. The second reinforcing ribs 218a may be coupled to the lower surface portion of the lower body 211.

The body 210 may be positioned at the rear surface of the front panel 150 so that the fastening bracket 180 is inserted into the accommodation groove 214a and the fastening member 290 passes through the fastening portion 214b and can be fastened to the fastening bracket 180.

The body 210 may include mounting portions 213 which are provided on both sides of the lower body 211 and on which voice input devices 230 are installed (for illustrative purposes, only one mounting portion 213 is shown in FIG. 7). The mounting portion 213 may protrude laterally from the side surface of the lower body 211.

The mounting portion 213 may include a first device seating portion 213a which is recessed rearward from the front surface of the body 210. The voice input device 230 may be disposed in the first device seating portion 213a. The first device seating portion 213a may be disposed at both sides of the accommodation groove 214a.

The voice input device 230 may include a first input device 230a provided at one of the two mounting portions 213 and a second input device 230b provided at the other of the two mounting portions 213. The first input device 230a and the second input device 230b may have the same configuration. For example, the first input device 230a may be positioned at the rear side of the first panel hole 152a and the second input device 230b may be positioned at the rear side of the second panel hole 152b. The first and second input devices 230a, 230b may be installed at the same height as each other.

The voice input device 230 may include a substrate 232 on which a microphone 233 is installed or connected and a sealing member 235 provided on a front surface portion of the substrate 232 and in contact with the rear surface of the front panel 150. For example, the sealing member 235 may be made of a rubber material (not limited thereto).

The substrate 232 is formed with a microphone hole 232a through which the voice transmitted through the panel hole 152 is transmitted. The microphone hole 232a may have a circular shape (not limited thereto). The microphone 233 may be installed on the rear surface portion of the substrate 232 to communicate with the microphone hole 232a to collect voice.

The sealing member 235 seals the space between the voice input device 230 and the front panel 150 so as to prevent the noise generated in the appliance 10 from being transmitted to the microphone 233.

Since the voice input device 230 can be in close proximity with the front panel 150 through the sealing member 235, even when there is vibration during operation of the appliance 10, an impact between the voice input device 230 and the front panels 150 may be prevented. For example, the sealing member 235 may be made of a rubber material (not limited thereto).

The sealing member 235 may have a polyhedral shape (not limited thereto). For example, the sealing member 235 may have a hexahedral shape having a relatively small width in the front and rear direction. The sealing member 235 may be formed with a sealing opening portion 235a that is in communication with the panel hole 152 of the front panel 150. The sealing opening portion 235a may be formed so that a central portion of the sealing member 235 passes through in the front and rear direction. For example, the shape of the sealing opening portion 235a may be circular (not limited thereto). The size of the sealing opening portion 235a may be larger than the size of the panel hole 152.

The voice input device 230 further includes a cover 234 which is disposed on the device seating portion 213a and is disposed to surround the rear surface portion of the substrate 232. The cover 234 may be disposed to support the side surface portion of the substrate 232.

The cover 234 may be configured to contact the rear surface of the microphone 233 to press the voice input device 230 in a forward direction. Therefore, the voice input device 230 can be in close proximity with the rear surface of the front panel 150. For example, the cover 234 may be made of a rubber material (not limited thereto).

The voice input device 230 may further include a cable C connected to the substrate 232. The cable C may extend upward and may extend above the voice recognition device 200 together with a cable connected to the sound output device 250.

The upper body 212 may extend upward from the lower body 211. The support protrusion 212e for coupling the body 210 to the support plate 160 may be provided at the upper end portion of the upper body 212, such as shown.

The upper body 212 may include a rear surface portion 212a on which the speaker hole 215 is formed and two side surface portions 212b which each extend forward from the peripheral portion of the rear surface portion 212a. The speaker hole 215 may be formed to be opened at a position corresponding to the speaker 255. For example, the speaker hole 215 may be a circular opening portion in the rear surface portion 212a of the upper body 212 (not limited to any particular shape).

The second device seating portion 212c on which the sound output device 250 is installed may be defined by the rear surface portion 212a and the two side surface portions 212b. The second device seating portion 212c can be understood as a space which is recessed rearward from the front surface of the upper body 212. The second device seating portion 212c may be referred to as a "speaker accommodation portion" in that a speaker can be accommodated therein.

The two side surface portions 212b may further include a device hook 212d for supporting the sound output device 250. A plurality of device hooks 212d may be provided. For example, the two device hooks of the plurality of device hooks 212d may be disposed on one of the two side surface portions 212b. In addition, the other two device hooks may be disposed on the other side surface portion. It is understood that the member for supporting the sound output device 250 is not limited to a hook structure.

The device hook 212d may support a front surface portion of the sound output device 250. The process of mounting the sound output device 250 to the upper body 212 will be briefly described. When the sound output device 250 moves backward and is disposed in the second device seating portion 212c, the two side surface portions 212a and the device hooks 212d positioned on the respective side surface portions 212a can be deformed in directions far from each other.

When the sound output device 250 is disposed on the second device seating portion 212c, the two side surface portions 212b are moved to their original positions by the restoring force, and the plurality of device hooks 212D can be hooked on the front surface of the sound output device 250. Therefore, it is possible to prevent the sound output device 250 from falling forward.

The two side surface portions 212b may be provided with a cutout portion 223 for facilitating the deformation of the device hook 212d. Two cutout portions 223 may be formed on the upper side and the lower side of the device hook 212d. The device hook 212d can be deformed between the two cutouts 223 in the lateral direction.

At least one main body through hole 216 is formed in the rear surface portion 212a. A plurality of main body through holes 216 may be provided and formed at a height corresponding to the plurality of device hooks 212d. The main body through hole 216 can be understood as a hole through which the processing tool can be inserted during manufacturing, e.g., during the process of machining the device hook 212d or the cutout portion 223.

The sound output device 250 may include an output device main body 251 having a speaker opening portion 251a and a speaker 255 provided in the speaker opening portion 251a and configured to output sound. The output device main body 251 may be configured to extend in the vertical direction. The speaker opening portion 251a may be formed to pass through the output device main body 251 in the front and rear direction. The speaker 255 may be exposed to the outside through the speaker opening portion 251a.

The sound output device 250 may further include a boss support portion 252 provided on the output device main body 251. The boss support portion 252 may be coupled to the boss 221 provided on the upper body 212. The boss 221 may be configured to protrude forward from the rear surface portion 212a. For example, the boss support portion 252 may have a partial cut-out ring shape and may surround the outer circumferential surface of the boss 221.

Figure 11:
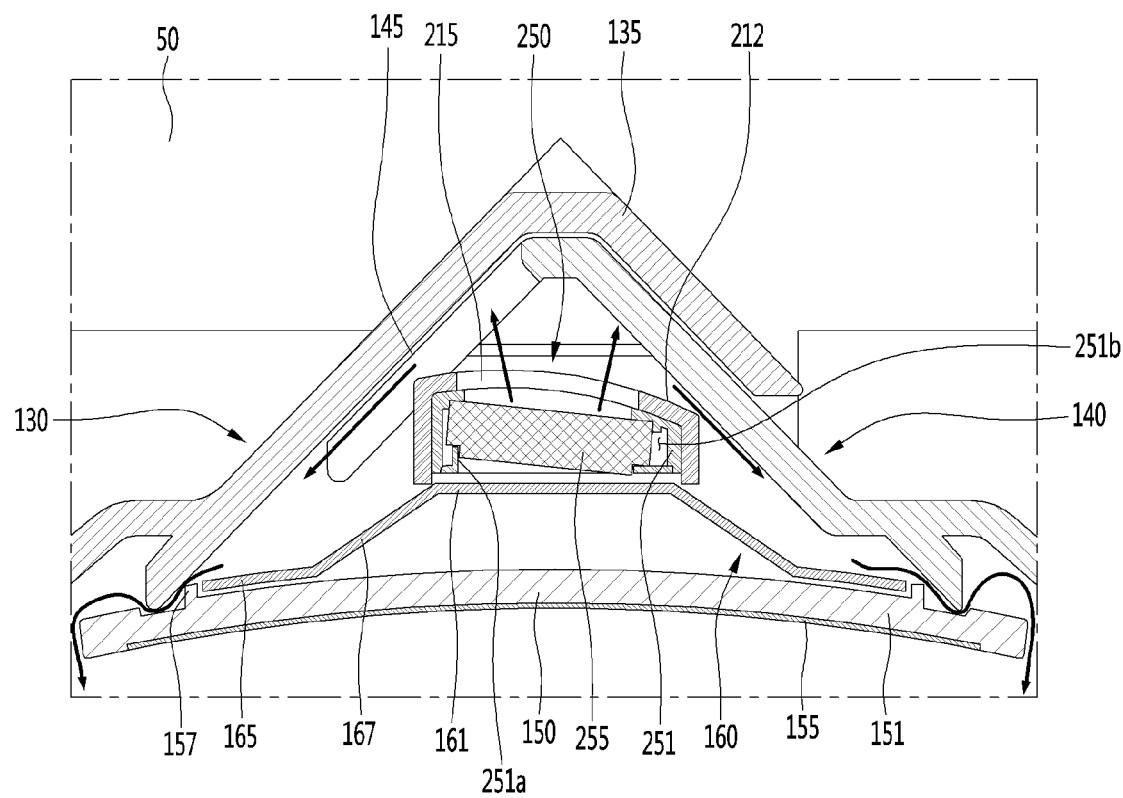
FIG. 11 is a sectional view taken along line XI-XI' in FIG. 1.

FIG. 11 is a sectional view taken along line XI-XI' in FIG. 1. Referring to FIG. 11, a sound output device 250 may be installed at the rear side of the front panel 150 in the appliance 10 according to the first embodiment of the present invention. More particularly, a support plate 160 may be coupled to a rear surface of the front panel 150 and an upper body 212 of the voice recognition device 200 may be coupled to a rear surface of the support plate 160.

The support plate 160 may include a plate portion 161 to which the upper body 212 is coupled, a plate extension portion 167 which extends obliquely forward from the plate portion 151, and a flange portion 165 which extends from the plate extension portion 167 in the lateral direction and contacts the rear surface of the front panel 150.

The plate portion 161 and the plate extension portion 167 have bent shapes and the plate extension portion 167 and the flange portion 165 have bent shapes. The plate portion 161 and the plate extension portion 167 may be spaced apart from the rear surface of the front panel 150 forward. The plate portion 161 may extend substantially parallel to the rear surface of the front panel 150.

The sound output device 250 may be supported by the plate portion 161 so that the speaker 255 provided in the sound output device 250 can be spaced apart from the front panel 150 in a direction of an inside of the appliance.

On the rear surface of the front panel 150, a plate protrusion 157 for supporting the end portion of the flange portion 165 is provided. For example, the plate protrusion 157 may be in contact with the end portion of the flange portion 165, or adjacent thereto. The plate protrusion 157 may protrude rearward from the rear surface of the front panel 150.

The sound output device 250 includes an output device main body 251 forming an accommodation space 251b for accommodating a speaker 255, and the rear surface portion of the output device main body 251 includes a speaker opening portion 251a for transmitting the sound output from the speaker 255 to the rear side. The speaker opening portion 251a may communicate with the accommodation space 251b.

The speaker opening portion 251a may be opened toward the rear side of the sound output device 250. In other words, the speaker opening portion 251a may be opened toward the first and second panel flanges 135 and 145 of the first and second side panels 130 and 140. The first and second panel flanges 135 and 145 may be disposed on the rear side of the front panel 150 and spaced apart from the rear side of the speaker opening portion 251a.

The upper body 212 may include a speaker hole 215 disposed on the rear side of the speaker opening portion 251a. The speaker opening portion 251a and the speaker hole 215 may be aligned together in the front and rear direction. With such configuration, the sound output from the speaker 255 can pass through the speaker opening portion 251a and be transmitted to the rear through the speaker opening portion 215.

The first and second side panels 130 and 140 may perform a function of a howling plate which generates a howling sound by the sound output from the speaker 255. More particularly, the first and second panel flanges 135 and 145 are positioned on the rear side of the speaker 255 and may have a bent shape in a V shape (not limited thereto).

The sound output from the speaker 255 may be reflected on the bent portion of the first panel flange 135 or the second panel flange 145 and transmitted forward. In this process, the first and second panel flanges 135 and 145 may be vibrated by the sound and thus a howling sound may be generated.

The sound reflected to the front side of the first and second panel flanges 135 and 145 can be transmitted to the front side of the appliance 10 through the space between the first and second panel flanges 135 and 145 and the support plate 160 and the space between the first and second flanges 135 and 145 and the front panels 150. Accordingly, the user can recognize the sound output from the speaker 255.

Figure 13:
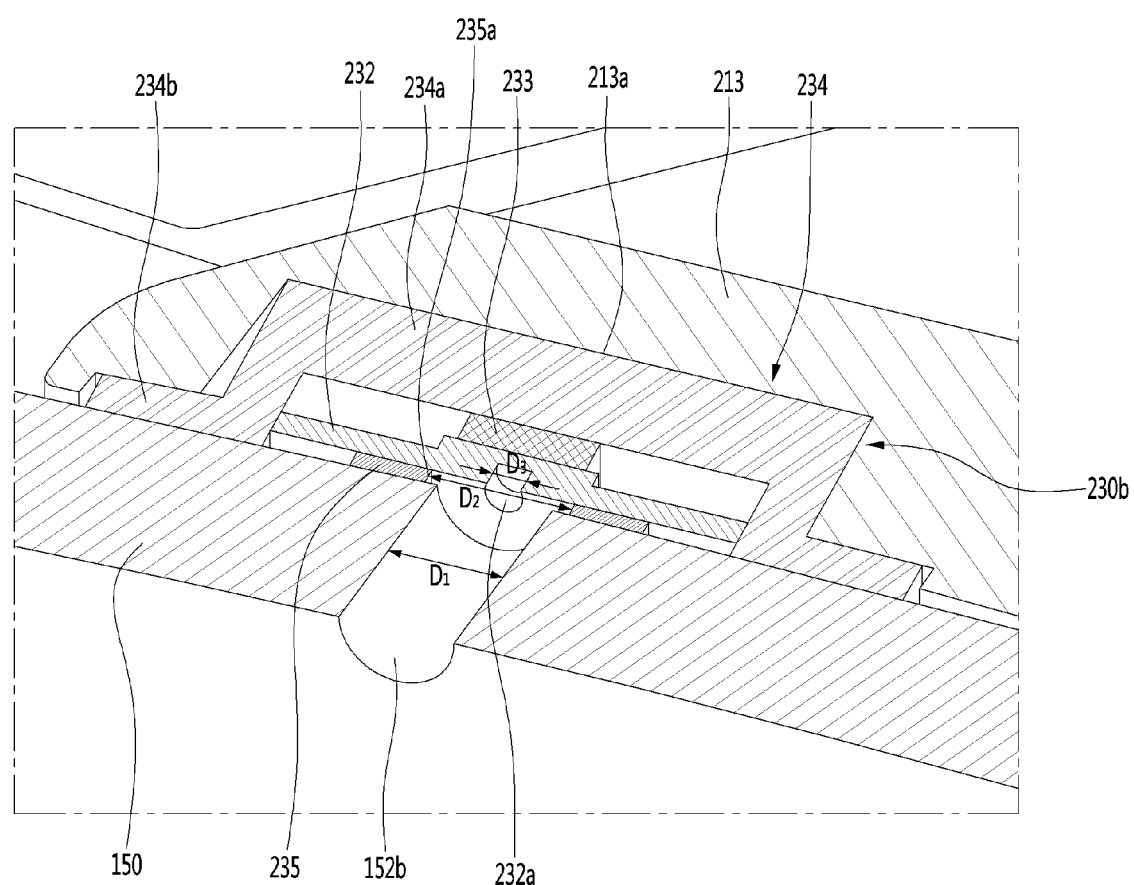
FIG. 13 is a cross-sectional view illustrating a configuration of the voice input device according to the first embodiment.
Figure 14:
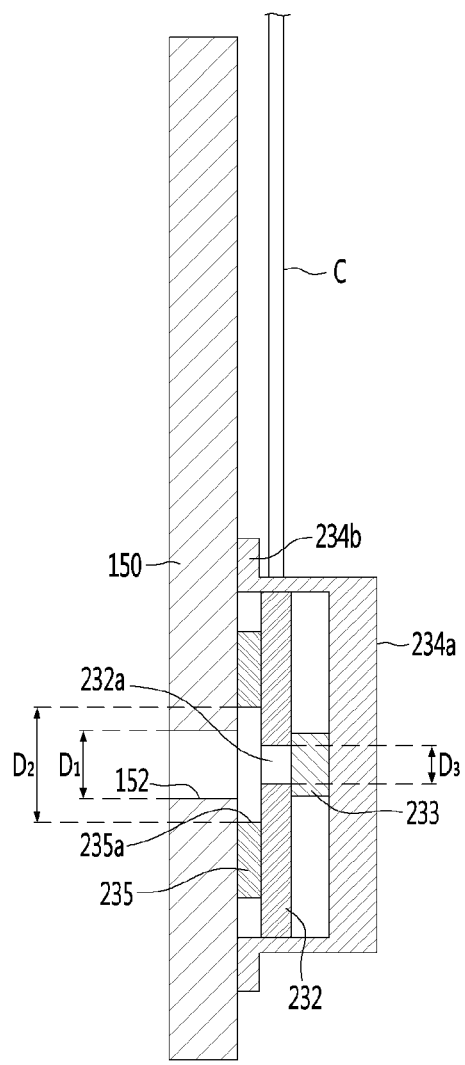
FIG. 14 is a longitudinal sectional view illustrating a configuration of the voice input device according to the first embodiment.

FIG. 12 is a sectional view taken along line XII-XII' in FIG. 1. FIG. 13 is a cross-sectional view illustrating a configuration of the voice input device according to the first embodiment of the present invention. FIG. 14 is a longitudinal sectional view illustrating a configuration of the voice input device according to the first embodiment.

Referring to FIG. 12, the voice input device 230 may be installed in the lower body 211 of the body 210. More particularly, a mounting portion 213 on which the voice input device 230 is mounted may be provided on both sides of the lower body 211, such as shown in FIG. 12. The mounting portion 213 may be recessed rearward from the front surface of the lower body 211 so as to face the rear surface of the front panel 150. The voice input device 230, in particular, the cover 234, may be disposed on the inner surface of the mounting portion 213.

The voice input device 230 may be positioned behind the front panel 150. More particularly the voice input device 230 may be positioned on the rear side of the panel hole 152. The first input device 230a may be disposed on the rear side of the first panel hole 152a and the second input device 230b may be disposed on the rear side of the second panel hole 152b.

The first and second panel holes 152a and 152b may be spaced apart from each other by a predetermined or set distance S1 so that the user's voice V1 is readily recognized and the error of the recognized information is relatively small. For example, the first and second panel holes 152a and 152b may be spaced apart from each other by about 3.5 cm to about 4.5 cm. The diameter of the first and second panel holes 152a and 152b may be in a range of 1.5 mm to 2.5 mm. Of course, the spacing and size of the first and second panel holes 152a and 152b are not limited thereto.

The voice input device 230 may be in contact with the rear surface of the front panel 150. More particularly, the cover 234 of the voice input device 230 may be in contact with or be in close proximity with the rear surface of the front panel 150. More particularly, the cover 234 includes a cover main body 234a disposed to surround the microphone 233 or the rear portion of the PCB 232, and a cover flange 234b extending from the cover main body 234a in the lateral direction and contacting the rear surface of the front panel 150. The cover main body 234a may surround the side of the PCB 232 or the microphone 233.

A PCB 232, a microphone 233, and a sealing member 235 may be positioned in the inner space of the cover 234. As shown, for example, the cover 234 may be disposed to surround the rear portion of the PCB 232 or the microphone 233 and can press the microphone 233 and the PCB 232 toward the front panel 150. For example, the rear surface of the microphone 233 may be disposed on the inner surface of the cover 234.

The sealing member 235 of the voice input device 230 may be in contact with or be in close proximity with the rear surface of the front panel 150. The sealing member 235 may be formed with a sealing opening portion 235a that is in communication with the panel hole 152. The panel hole 152 and the sealing opening portion 235a may be aligned in the front and rear direction. The voice of the user can be transmitted through the panel hole 152 to the inside of the voice input device 230 through the sealing opening portion 235a.

The PCB 232 may be formed with a microphone hole 232a that is in communication with the sealing opening portion 235a. The sealing opening portion 235a and the microphone hole 232a may be aligned together in the front and rear direction. The user's voice transmitted to the inside of the voice input device 230 through the sealing opening portion 235a can be transmitted to the microphone 233 through the microphone hole 232a. The microphone hole 232a and the microphone 233 may be in communication with each other.

The panel hole 152, the sealing opening portion 235a, and the microphone hole 232a may be aligned in the front and rear direction and have different sizes from each other (not limited to any particular size).

More particularly, the diameter D2 of the sealing opening portion 235a may be larger than the diameter D1 of the panel hole 152. The diameter D1 of the panel hole 152 may be larger than the diameter D3 of the microphone hole 232a. For example, the diameter D1 may be in the range of 1.8 mm to 2.2 mm, and the diameter D2 may be in the range of 2.4 mm to 2.6 mm, and the diameter D3 may be in the range of 0.5 mm to 1.0 mm.

With this configuration, when the voice input device 230 is installed at the rear surface of the front panel 150, even if an error occurs in the installation position of the sealing member 235 or deformation occurs when the sealing member 235 is in close proximity with the front panel 150, the sealing member 235 may not block blocking the panel hole 152 or the microphone hole 232a. Therefore, a voice transmission path through which voice of the user is transmitted to the microphone 233 can be readily secured.

Figure 15:
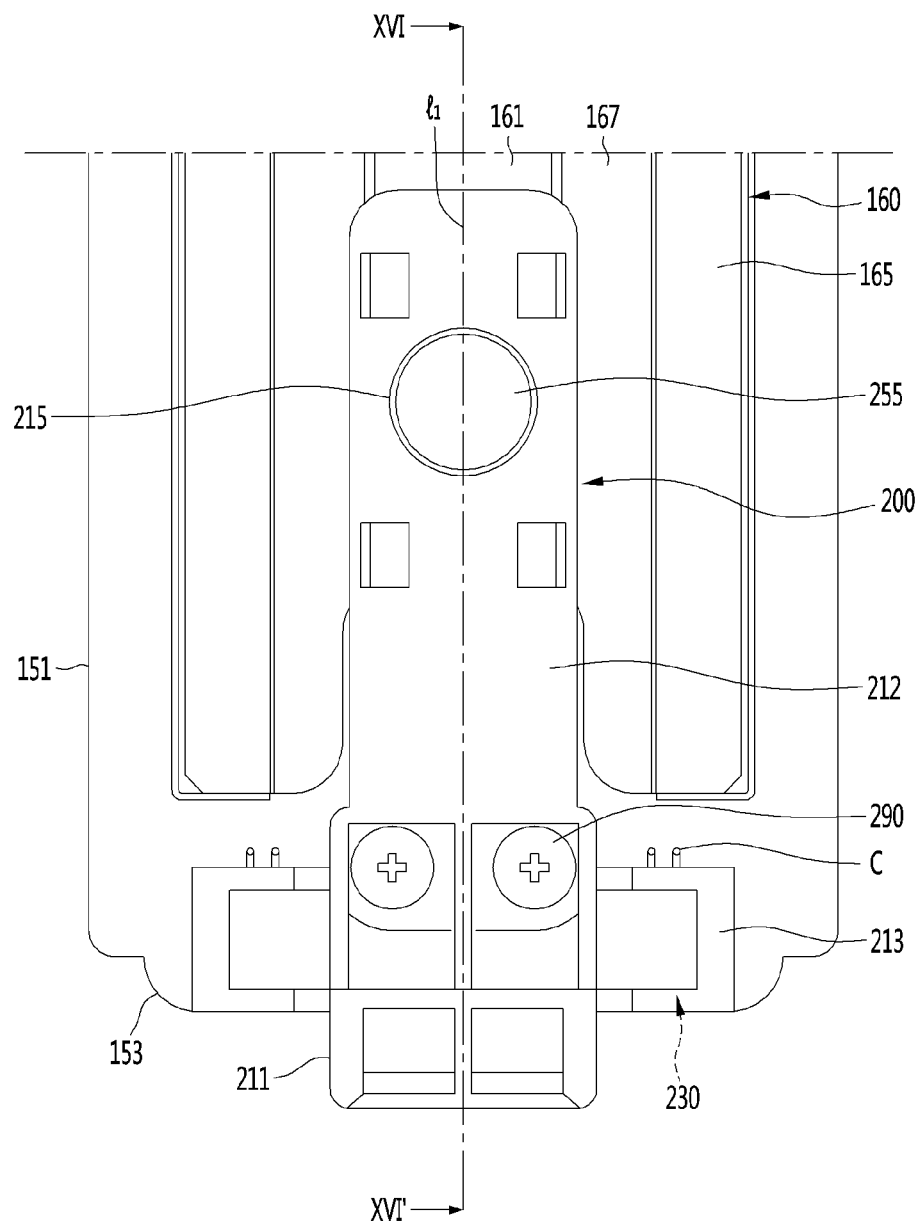
FIG. 15 is a rear view illustrating a state where the voice recognition device and the front panel are coupled together according to the first embodiment.
Figure 16:
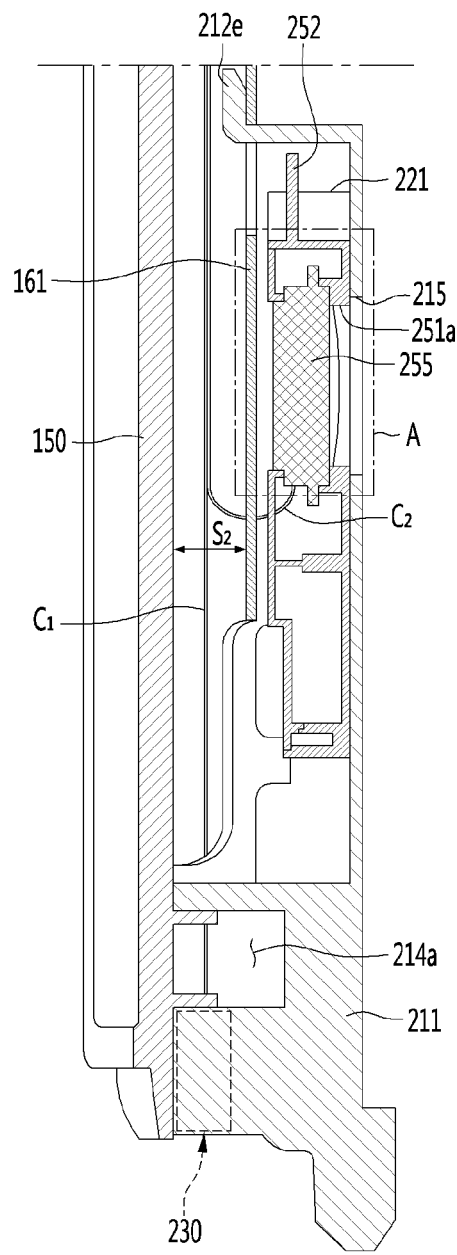
FIG. 16 is a sectional view taken along line XVI-XVI' of FIG. 15.
Figure 17:
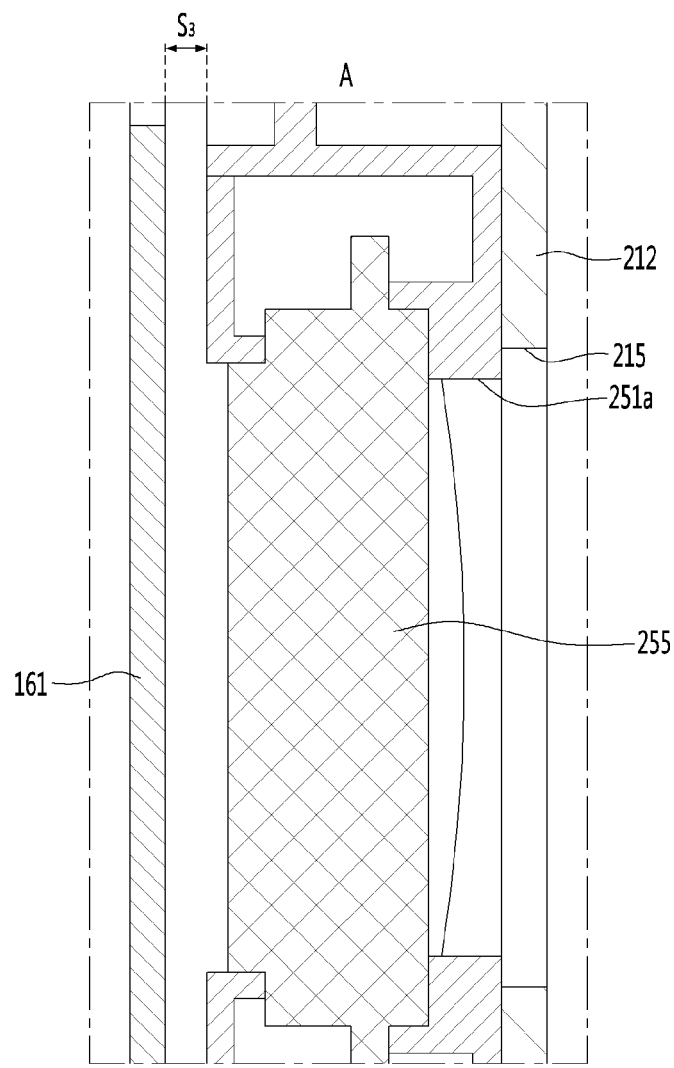
FIG. 17 is an enlarged view of portion "A" in FIG. 1.
Figure 18:
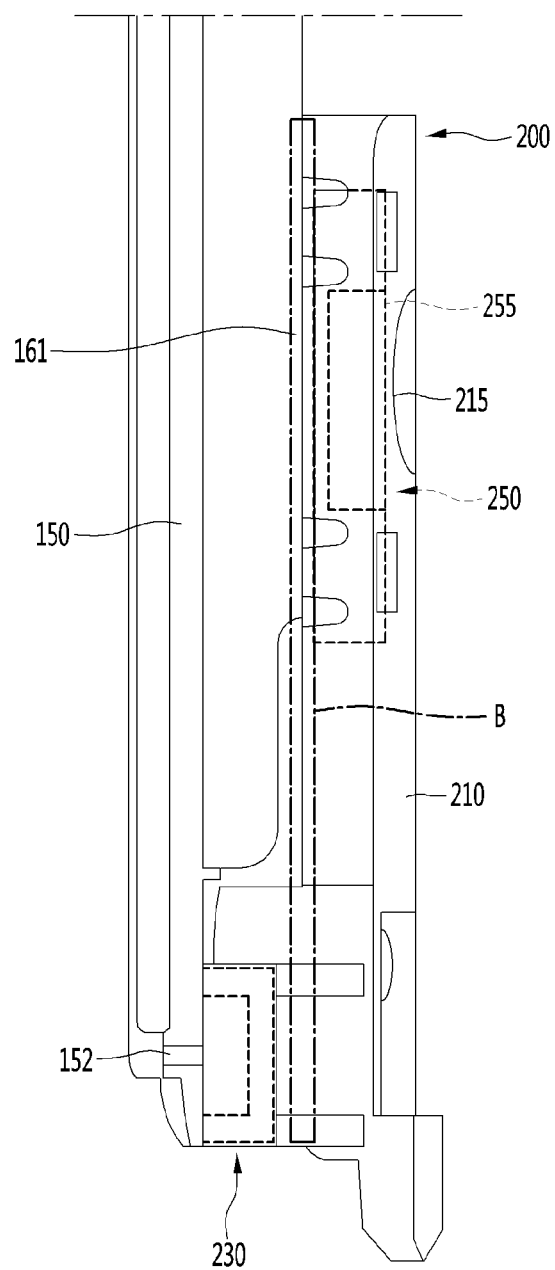
FIG. 18 is a side view illustrating a state of a partition wall B according to the first embodiment.

FIG. 15 is a rear view illustrating a state where the voice recognition device is coupled to the front panel according to the first embodiment of the present invention. FIG. 16 is a sectional view taken along line XVI-XVI' of FIG. 15. FIG. 17 is an enlarged view of portion "A" in FIG. 1. FIG. 18 is a side view illustrating a state of a partition wall B according to the first embodiment.

Referring to FIGS. 15-17, the voice recognition device 200 may be coupled to the rear side of the front panel 150. The upper portion of the voice recognition device 200 may be supported by the support plate 160 and the lower portion thereof may be fastened to the front panel 150 by the fastening member 290.

The sound output device 250 may be disposed at the center line l1 of the voice recognition device 200 in the vertical direction. In other words, the center line l1 may pass through the center of the second device seating portion 212c of the upper body 212 and may pass through the center of the speaker 255.

More particularly, the sound output device 250 may be supported by the support plate 160 and may be spaced rearward from the rear surface of the front panel 150. The support plate 160 may be formed by bending a plate portion 161, a plate extension portion 167, and a flange portion 165. The flange portion 165 may contact the rear surface of the front panel 150 and the plate portion 161 may be spaced apart from the rear surface of the front panel 150 to the rear by a predetermined distance S2. For example, the predetermined distance S2 may be in the range of 6 mm to 7 mm (not limited thereto).

The space between the rear surface of the front panel 150 and the plate portion 161 defined by the predetermined distance S2 forms a cable path through which a cable C1 extending from the voice input device 230 and a cable C2 extending from and sound output device 250 may pass.

The rear surface of the sound output device 250 and, in particular, the rear surface of the output device main body 251 may be spaced apart from the plate portion 161 of the support plate 160 by a predetermined distance S3. For example, the predetermined distance S3 may be in the range of 1 mm to 2 mm (not limited thereto).

The vibration generated in the appliance 10 when the appliance 10 is operated can be transmitted to the plate portion 161. Accordingly, in a case where the output device main body 251 is in contact with the plate portion 161, the vibration is transmitted to the sound output device 250 to cause a vibration in the speaker 255 and thus the output performance of the speaker 255 may be degraded or reduced. To prevent this, the output device main body 251 is spaced apart from the plate portion 161.

The voice input device 230 may be disposed at both sides of the voice recognition device 200 with respect to the centerline l1 in the vertical direction of the voice recognition device 200, such as shown.

The voice input device 230 may be disposed at the front side of the sound output device 250 and at the rear side of the front panel 150. More particularly, the voice input device 230 may be in close proximity with the rear surface of the front panel 150 and may be disposed below the support plate 160.

Accordingly, the distance from the rear surface of the front panel 150 to the voice input device 230 may be less than the distance from the rear surface of the front panel 150 to the sound output device 250. In other words, the distance from the rear surface of the front panel 150 to the microphone 233 may be less than the distance from the rear surface of the front panel 150 to the speaker 255.

Referring to FIG. 18, the voice input device 230 and the sound output device 250 according to the first embodiment of the present invention may be coupled to the body 210 to form a single body.

More particularly, the voice recognition device 200 may include a partition wall B which is disposed between the voice input device 230 and the sound output device 250. The partition wall B may include at least a portion of the support plate 160 and at least a portion of the body 210. The voice input device 230 may be positioned at the front side of the partition wall B and the sound output device 250 may be positioned at the rear side of the partition wall B.

The voice input device 230 may be positioned below the partition wall B and the sound output device 250 may be positioned above the partition wall B. The voice input device 230 may include two input devices 230a and 230b (not limited to two). The two input devices 230a and 230b may be spaced apart from each other in the transverse direction.

The partition wall B partitions a voice input device 230 for inputting a voice of a user and a sound output device 250 for outputting sound. The partition wall B may perform a function of separating voice/sound input or output from each device. Therefore, it is possible to prevent the sound output to the rear side of the front panel 150 through the speaker 255 from being directly transmitted from the front side of the front panel 150 to the microphone 233 which collects the voice.

Figure 19:
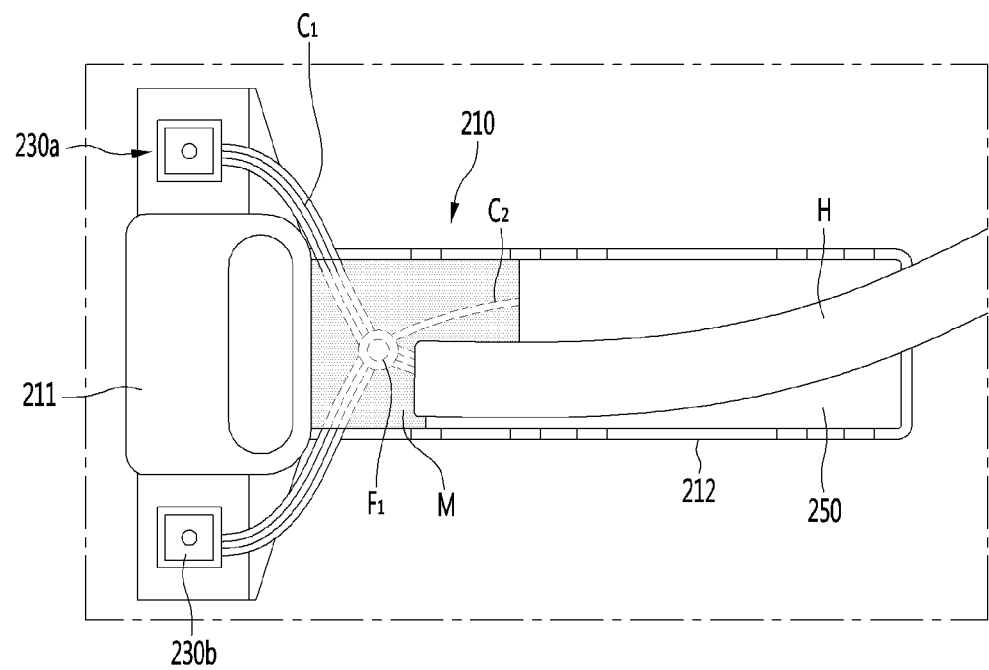
FIG. 19 is a view illustrating a state where a cable C is coupled to a voice recognition device according to the first embodiment.
Figure 20:
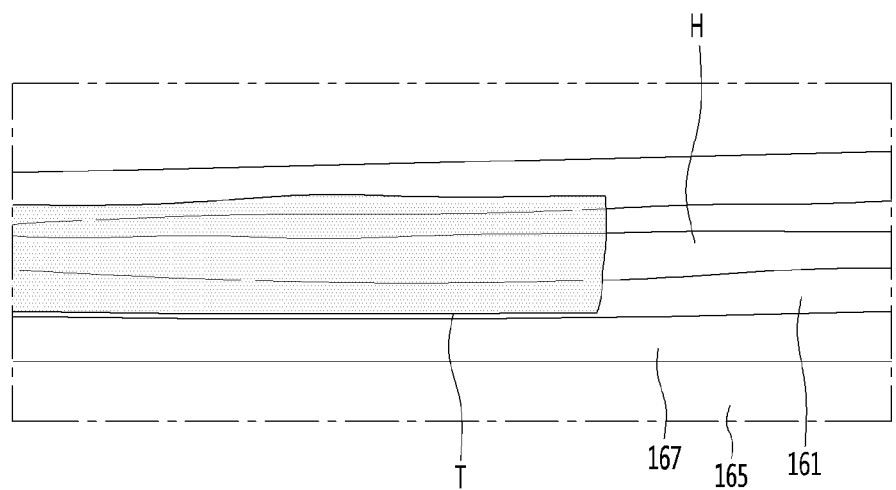
FIG. 20 is a view illustrating a state where a harness H is positioned in the rear space of the front panel according to the first embodiment.

FIG. 19 is a view illustrating a state where a cable C is coupled to a voice recognition device according to the first embodiment of the present invention. FIG. 20 is a view illustrating a state where a harness H according to the first embodiment is positioned in the rear space of the front panel.

Referring to FIGS. 19 and 20, a voice recognition device 200 may include a fixing member F1 that fixes a cable C1 which extends from the voice input device 230 and a cable C2 that extends from the sound output device 250.

The voice recognition device 200 may be provided with a molding portion M so that the cables C1 and C2 can be fixed or secured to the body 210. The cables C1 and C2 can be fixed to the cable space portion 212f (see, e.g., FIG. 9) of the upper body 212 by the molding portion M. The cable space portion 212f may be formed at a lower side of the speaker 255 as a space recessed rearward from a lower front surface of the upper body 212.

The voice recognition device 200 may further include a harness H for holding a cable C1 extending from the voice input device 230 and the cable C2 extending from the sound output device 250. The harness H has a cylindrical shape and is disposed so as to surround the outer sides of the cables C1 and C2 so that the cables C1 and C2 can be protected against an external impact.

The cables C1 and C2 may be molded by the molding portion M and then extend into an inside of the harness H. The harness H may extend upward from the voice recognition device 200 and be disposed in a space between the rear surface of the front panel 150 and the plate portion 161. The harness H may be attached to the support plate 160 by the tape T in order to prevent or substantially reduce any shaking of the harness H.

Figure 21:
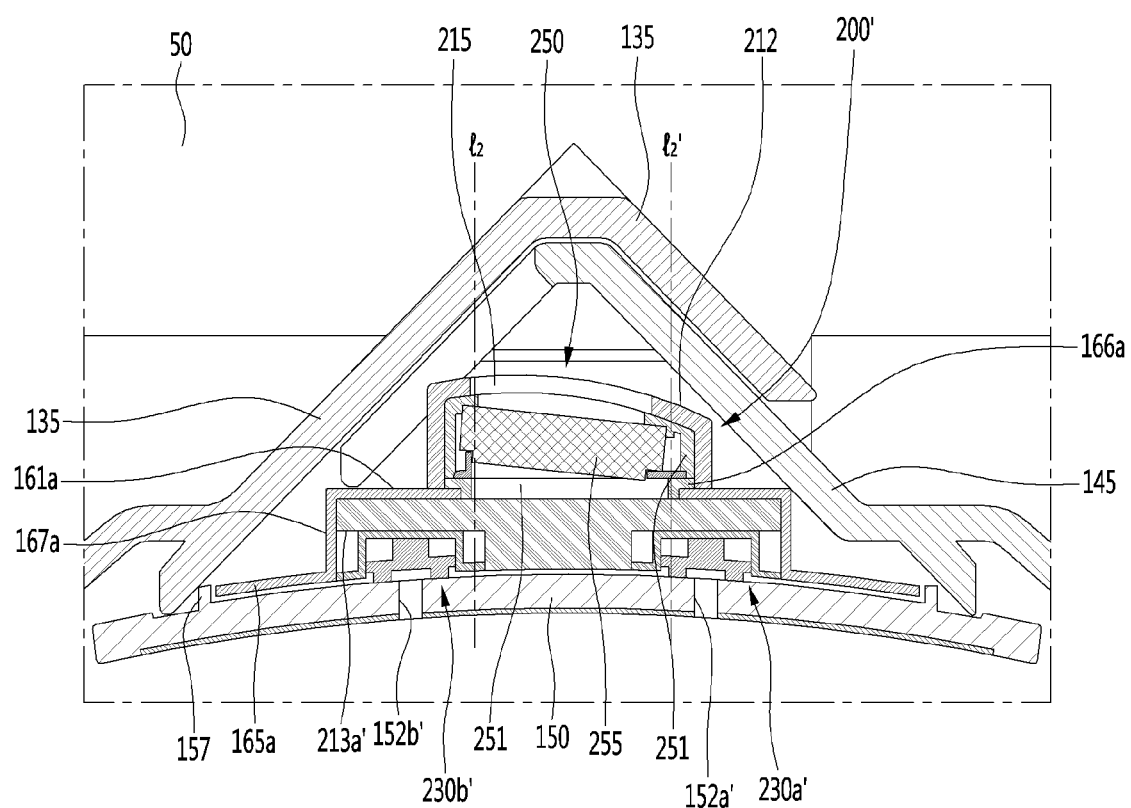
FIG. 21 is a sectional view illustrating the configuration of a voice recognition device according to a second embodiment of the present invention.
Figure 22:
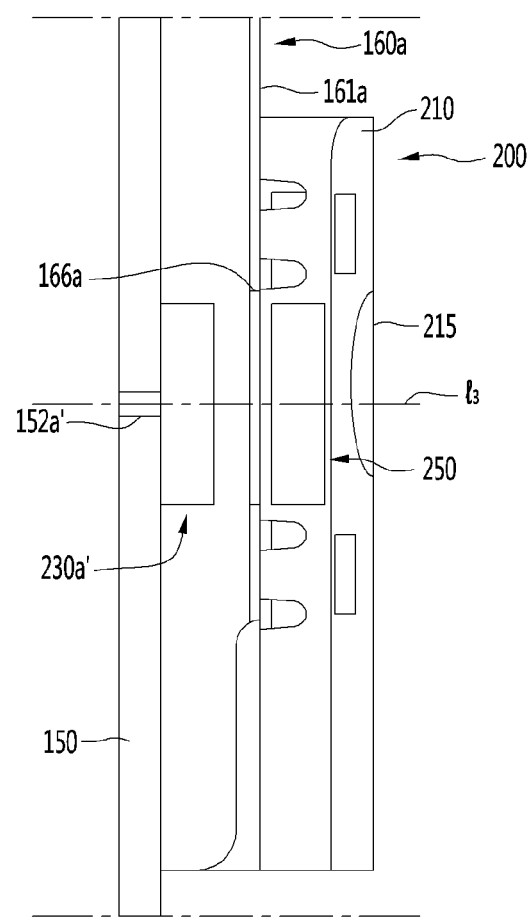
FIG. 22 is a side view illustrating a configuration of the voice recognition device according to the second embodiment.

FIG. 21 is a sectional view illustrating the configuration of a voice recognition device according to a second embodiment of the present invention. FIG. 22 is a side view illustrating a configuration of the voice recognition device according to the second embodiment.

Referring to FIGS. 21 22, a voice recognition device 200' may include a voice input device 230 and a sound output device 250, which are disposed at an overlapped position with each other in the front and rear direction.

The configuration of the voice input device 230, that is, the substrate 232, the microphone 233, the cover 234, the sealing member 235, and the sealing member 235 in close proximity with the rear surface of the front panel for the second embodiment is substantially the same as that described above for the first embodiment and thus for convenience purposes is not repeated herein.

Similarly, the sound output device 250, that is, the output device main body 251 having the speaker opening portion 251a and the speaker 255 for the second embodiment is substantially the same as that described above for the first embodiment and thus for convenience purposes is not repeated herein. Also, the sound output device 250 is installed above the body 210 of the voice recognition device 200' of the second embodiment, which is the substantially the same as that of the first embodiment and thus for convenience purposes is not repeated herein.

The voice input device 230 may be installed in a space defined by the rear surface of the front panel 150 and the support plate 160a. The support plate 160a may include a plate portion 161a extending in the vertical direction and flange portions 165a provided on both sides of the plate portion 161a and coupled to the rear surface of the front panel 150, and an extension portion 167a extending from the flange portion 161a to the flange portion 167a.

A mounting portion 213' may be provided on the front surface of the plate portion 161a. The first input device 230a and the second input device 230b may be installed on both sides of the mounting portion 213'. The mounting portion 213' may include two first device seating portions 213a' which are recessed from a front surface of the mounting portion 213' to the rear side, and the first and second input devices 230a and 230b may be installed in the two first device seating portions 213a'.

The sound output device 250 may be installed on the rear surface of the plate portion 161b. Accordingly, the plate portion 161a may function as a partition wall for partitioning the voice input device 230 and the sound output device 250.

A partition wall opening portion 166a may be formed in the plate portion 161a. The mounting portion 213' and the body 210 may be detachably coupled through the partition wall opening 166a. The sound output device 250 may be coupled to the body 210. Accordingly, the voice input device 230 and the sound output device 250 may be integrally coupled to the body 210 through the partition wall opening 166a. With this configuration, the assemblability of the voice input device 230 and the sound output device 250 with respect to the body 210 may be improved.

The first extension line l2 passing through the first input device 230a in the front and rear direction may be formed so as to meet or pas through the sound output device 250. The second extension line l2' passing through the second input device 230b in the front and rear direction may be configured to meet or pass through the sound output device 250.

In particular, the first extension line l2 can meet or pass through the microphone 233 of the first input device 230a and the speaker 255 of the sound output device 250, and the second extension line l2' can be configured to meet or pass through the microphone 233 of the second input device 230b and the speaker 255 of the sound output device 250. In other words, the microphone 233 and the speaker 255 of the first input device 230a and the microphone 233 and the speaker 255 of the second input device 230b may be disposed to overlap each other in the front and rear direction.

The extension line l3 extending passing through the panel hole 152a in the front and rear direction may be configured to pass through the central portion of the first input device 230a in the vertical direction and the central portion of the sound output device 250 in the vertical direction. In other words, the first input device 230a and the sound output device 250 may be disposed at the same height or substantially the same height. Although not illustrated in the drawing, the second input device 230b may also be disposed at the same height, or substantially the same height, as the sound output device 250.

The voice input device 230 and the sound output device 250 may be partitioned by the plate portion 160a even if the voice input device 230 and the sound output device 250 are positioned relatively close to each other, since the direction in which the voice input device 230 receives the voice and the direction in which the sound output device 250 outputs the sound are both directed backward, the voice recognition rate through the voice input device 230 can be prevented from being lowered.

Figure 23:
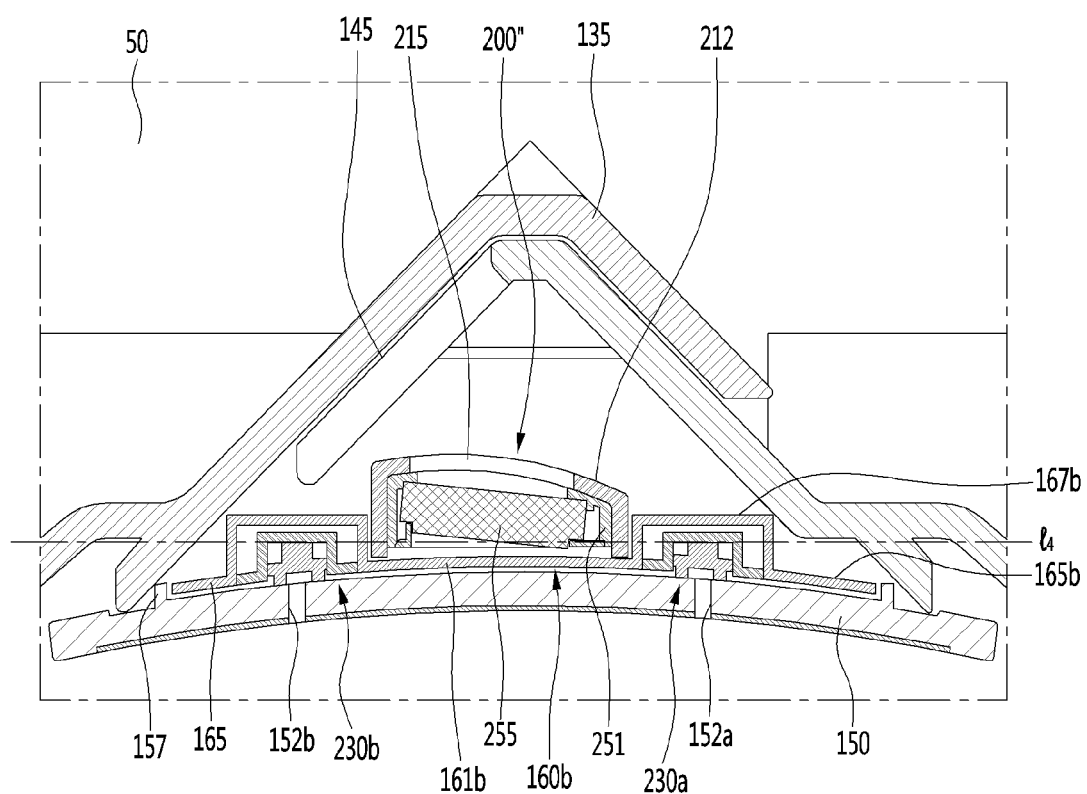
FIG. 23 is a sectional view illustrating a configuration of a voice recognition device according to a third embodiment of the present invention.

FIG. 23 is a sectional view illustrating a configuration of a voice recognition device according to a third embodiment of the present invention. Referring to FIG. 23, the voice recognition device 200" may include a support plate 160b for partitioning the voice input device 230a and the sound output device 250. The support plate 160b may include a plate portion 161b extending along the rear surface of the front panel 150 in the vertical direction. For example, the plate portion 161b may be in contact with the rear surface of the front panel 150.

The support plate 160b may further include extension portions 167b which are bent at both sides of the plate portion 161b. The extension portion 167b may be bent in a "⊏" shape (not limited thereto). The rear surface of the front panel 150 and the extension portion 167b may form an installation space in which the first input device 230a and the second input device 230b are installed or disposed. The first and second input devices 230a and 230b are spaced apart from each other in the lateral direction.

The installation space may include a mounting portion 213" on which the first and second input devices 230a and 230b are mounted or disposed. The first and second input devices 230a and 230b may be in close proximity with the inner surface of the mounting portion 213".

The sound output device 250 may be disposed to be aligned with respect to the first and second input devices 230a and 230b in the lateral direction. For example, the sound output device 250 may be disposed between the first and second input devices 230a and 230b. More particularly, an extension line traversing the center of the sound output device 250 in the front and rear direction may be configured to pass through the first and second input devices 230a and 230b.

The sound output device 250 may be disposed between the first and second input devices 230a and 230b. The sound output device 250 and the first and second input devices 230a and 230b may be separated by the support plate 160b. More particularly, the extension portion 167b may be positioned between the sound output device 250 and the first and second input devices 230a and 230b.

With this configuration, the support plate 160b can function as a partition wall between the sound output device 250 and the first and second input devices 230a and 230b so that the sound output from the sound output device 250 can be prevented from being transmitted to the voice input device 230.

Meanwhile, the lower portion of the body 210 accommodating the sound output device 250 may be positioned further downward than the lower portion of the support plate 160b, and the mounting portion 213' can be connected to both sides of the lower portion of the body 210.

Figure 24:
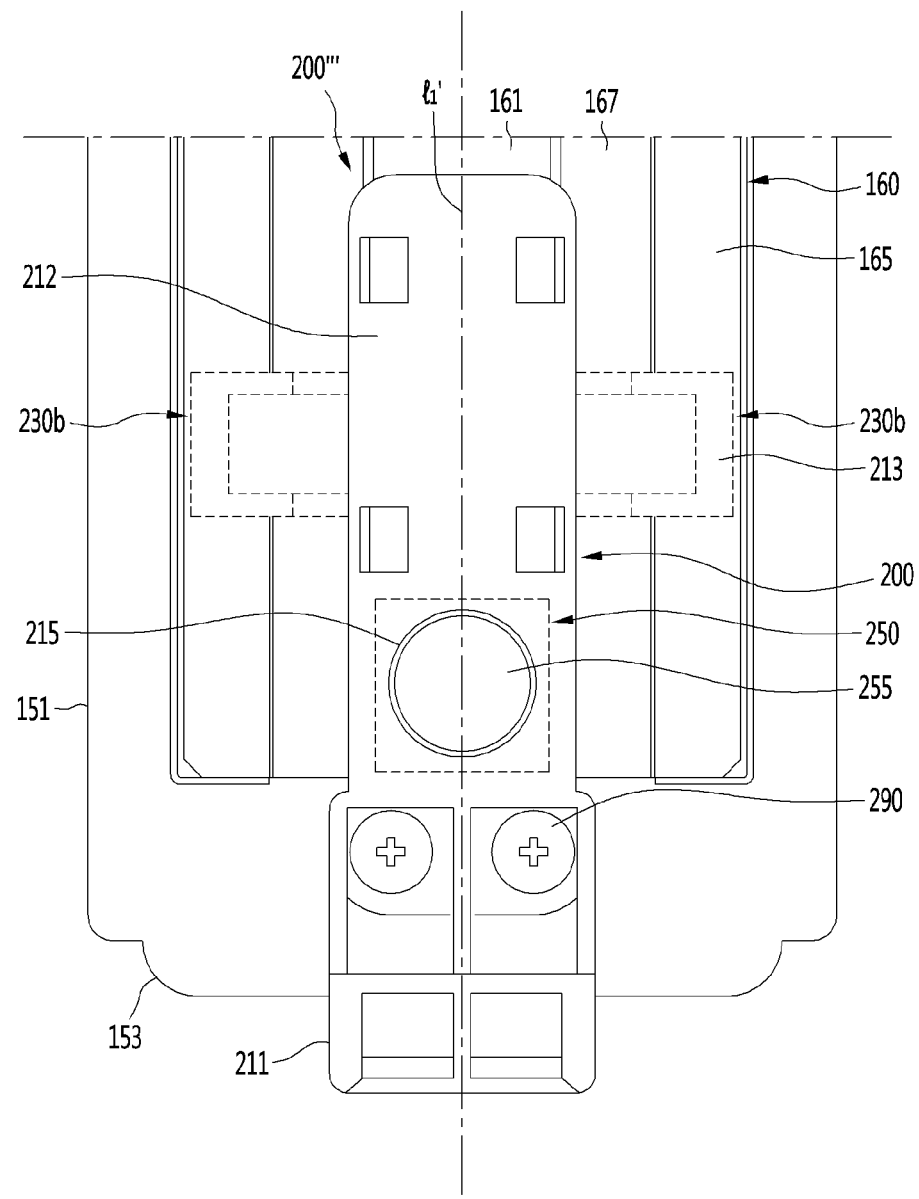
FIG. 24 is a rear view illustrating a state where the voice recognition device and the front panel are coupled together according to a fourth embodiment of the present invention.
Figure 25:
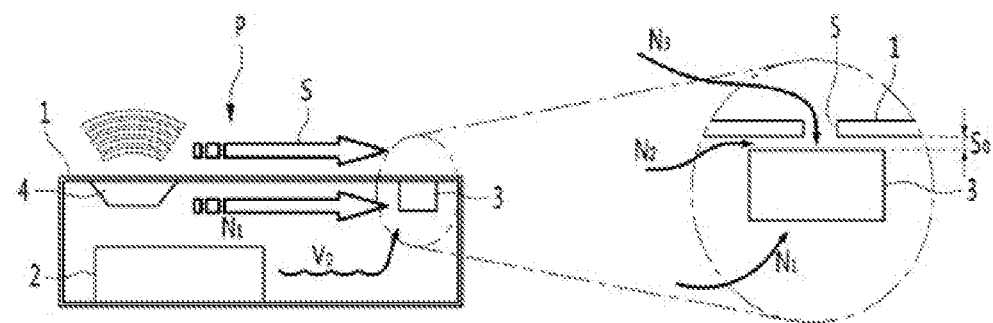
FIG. 25 is a view illustrating the voice input device and the sound output device provided in the appliance of the conventional art.

FIG. 24 is a rear view illustrating a state where the voice recognition device is coupled to the front panel, according to a fourth embodiment of the present invention.

Referring to FIG. 24, the voice recognition device 200''' may include two input devices 230a and 230b which are disposed at upper both sides of the body 210 and receive voice, and a sound output device 250 which is disposed below the two input devices 230a and 230b. The sound output device 250 may be provided in the lower body 211 and the two input devices 230a and 230b may be provided in the upper body 212.

The sound output device 250 may be disposed to be positioned along the center line l1' of the voice recognition device 200''' in the vertical direction. In other words, the center line l1' may pass through the center of the speaker 255 provided in the sound output device 250. The two input devices 230a and 230b may be spaced apart from each other at the center line l1' in the lateral direction.

The two input devices 230a and 230b are installed in the space between the rear surface of the front panel 150 and the support plate 160 and the sound output device 250 can be installed on the rear side of the support plate 160.

With this configuration, since the sound output device 250 and the two input devices 230a and 230b are symmetrically disposed with respect to the center line l1', the center of gravity of the voice recognition device 200''' can be more stably formed.

Since the support plate 160 functions as a partition wall between the sound output device 250 and the two input devices 230a and 230b, the sound output from the sound output device 250 can be prevented from being transmitted to the voice input device 230.

What is claimed is:

1. An appliance including a voice recognition device, comprising:
   a panel comprising a panel hole formed therein; and
   the voice recognition device configured to identify voice information and disposed on the panel,
   wherein the voice recognition device comprises:
      a body comprising a speaker accommodation portion and an opening portion, the opening portion being in communication with the speaker accommodation portion and opened in a direction towards an inside of the panel;
      a sound output device disposed on the speaker accommodation portion, the sound output device having a speaker;
      a plurality of mounting portions facing an inner surface of the panel, wherein the plurality of mounting portions and the speaker accommodation portion are integrally formed on the body;
      a plurality of voice input devices positioned in a space between the sound output device and the panel, the plurality of voice input devices installed on the plurality of mounting portions so as to contact the inner surface of the panel, each of the plurality of voice input devices comprising a microphone; and
      a partition wall that partitions a space between the plurality of voice input devices and the sound output device, the partition wall comprising a partition wall opening portion,
   wherein the speaker accommodation portion is positioned at a center line l1 of the voice recognition device along a vertical direction thereof,
   wherein the plurality of mounting portions are laterally spaced apart from each other about the center line l1,
      wherein the plurality of voice input devices are disposed between the partition wall and the panel, and the sound output device is disposed on an opposite side of the partition wall than are the plurality of voice input devices, and
      wherein the speaker accommodation portion is in communication with the plurality of mounting portions through the partition wall opening portion.

2. The appliance of claim 1,
   wherein the speaker accommodation portion and the mounting portion are recessed from one surface of the body facing the inner surface of the panel.

3. The appliance of claim 1,
   wherein the partition wall is coupled to the panel.

4. The appliance of claim 1, wherein the partition wall comprises:
   a support plate coupled to the inner surface of the panel; and
   at least a portion of the body.

5. The appliance of claim 4,
   wherein the appliance is an air conditioner, and
   wherein the panel is a front panel.

6. The appliance of claim 5,
   wherein the support plate comprises:
      a plate portion that extends along the inner surface of the panel in the vertical direction;
      a plate extension portion that is bent from the plate portion and extends toward the panel; and
      a flange portion that extends from the plate extension portion and is in contact with the inner surface of the panel.

7. The appliance of claim 6, further comprising:
   a plate protrusion that protrudes from the inner surface of the panel and supports an end portion of the flange portion.

8. The appliance of claim 1,
   wherein the voice input device and the sound output device are overlapped with each other with respect to a direction from the outside to an inside of the panel.

9. The appliance of claim 8,
   wherein the microphone and the speaker are overlapped with each other with respect to a direction from the outside to the inside of the panel.

10. The appliance of claim 8, further comprising:
    a support plate coupled to the panel,
    wherein the voice input device is disposed inside a space formed by the support plate and the panel, and
    wherein the sound output device is disposed outside the space formed by the support plate and the panel.

11. The appliance of claim 8,
    wherein the sound output device is disposed between the plurality of voice input devices.

12. The appliance of claim 11,
    wherein an extension line l4 crossing the center of the sound output device passes through the plurality of voice input devices.

13. The appliance of claim 1,
    wherein the plurality of voice input devices are disposed on the upper side of the sound output device or the lower side of the sound output device.

14. The appliance of claim 13,
    wherein the body comprises:
       a lower body having the plurality of mounting portions formed thereon; and
       an upper body that extends upward from the lower body, the upper body having the speaker accommodation portion formed thereon.

15. The appliance of claim 13,
    wherein the body comprises:
       a lower body having the speaker accommodation portion formed thereon; and
       an upper body that extends upward from the lower body, the upper body having the plurality of mounting portions formed thereon.

16. The appliance of claim 1, further comprising:
    a panel flange disposed inside the panel, the panel flange having a recessed portion to accommodate the voice recognition device, wherein the opening portion of the body faces the panel flange.

17. The appliance of claim 16, wherein the panel flange has a V shape.

18. The appliance of claim 16, further comprising:
a first side panel and a second side panel, the first and second side panels respectively disposed at both sides of the panel,
wherein the panel flange comprises:
  a first panel flange provided on the first side panel; and
  a second panel flange provided on the second side panel.

19. The appliance of claim 1,
wherein the panel extends in the vertical direction of the appliance, and
wherein the panel hole is positioned below a center of the panel in the vertical direction.

20. The appliance of claim 19,
wherein the panel comprises a panel main body and a film provided on a front surface of the panel main body, and
wherein the panel hole is positioned below a lower end of the film.

21. The appliance of claim 1,
wherein the sound output device further comprises:
  an output device main body having a speaker opening portion in communication with the opening portion of the body and on which the speaker is installed, and
  wherein the speaker is exposed to an outside of the sound output device through the speaker opening portion and the opening portion.

22. The appliance of claim 1, further comprising:
a fastening bracket provided on an inner surface of the panel; and
a fastening member which fixes a lower portion of the body with the fastening bracket.

23. The appliance of claim 22, further comprising:
a support plate coupled to the inner surface of the panel and to an upper portion of the body.

24. The appliance of claim 1, further comprising:
a cabinet inside of which a motor is installed,
wherein the panel is a front panel provided at a front side of the cabinet.

25. The appliance of claim 24,
wherein the sealing member protrudes outward from the PCB towards the inner surface of the panel, and
wherein the sealing member has a sealing opening portion in communication with the microphone hole.

26. The appliance of claim 24,
wherein the voice input device further comprises:
  a cover that surrounds the PCB and is disposed on the mounting portion.

27. The appliance of claim 26,
wherein the cover comprises a rubber material.

28. The appliance of claim 24,
wherein the cover comprises:
  a cover main body that surrounds the microphone and the PCB; and
  a cover flange that extends from the cover main body in the lateral direction and is in contact with the front panel.

29. The appliance of claim 24,
wherein the sealing member is installed at a front surface of the PCB and is in contact with the panel, and
wherein the microphone is installed at a rear surface of the PCB.

30. The appliance of claim 29,
wherein the voice input device further comprises:
  a cover that surrounds a rear portion of the PCB and is in contact with the microphone.

31. The appliance of claim 1, wherein the voice input device comprises:
  a printed circuit board (PCB) having a microphone hole formed therein that is in communication with the panel hole;
  a microphone installed in the PCB and in communication with the microphone hole; and
  a sealing member installed on the PCB and surrounds the panel hole.

32. The appliance of claim 31, wherein the sealing member comprises:
  a sealing opening portion in communication with the panel hole and the microphone hole.

33. The appliance of claim 32 wherein the sealing opening portion is larger than the panel hole.

34. The appliance of claim 33,
wherein a diameter of the sealing opening portion is greater than or equal to 2.4 mm and less than or equal to 2.6 mm, and
wherein a diameter of the panel hole is greater than or equal to 1.8 mm and less than or equal to 2.2 mm.

35. The appliance of claim 33,
wherein the panel hole is larger than the microphone hole.

36. The appliance of claim 35,
wherein a diameter of the panel hole is greater than or equal to 1.8 mm and less than or equal to 2.2 mm, and
wherein a diameter of the microphone hole is greater than or equal to 0.5 mm and less than or equal to 1.0 mm.

* * * * *